US012355132B2

(12) United States Patent
Ruhl et al.

(10) Patent No.: US 12,355,132 B2
(45) **Date of Patent: *Jul. 8, 2025**

(54) DEPLOYABLE ANTENNA SYSTEM

(71) Applicant: M.M.A. Design, LLC, Louisville, CO (US)

(72) Inventors: Lyn Eric Ruhl, Golden, CO (US); Asa Darnell, Cave City, KY (US); Mark Bailey, Longmont, CO (US)

(73) Assignee: M.M.A. DESIGN, LLC, Broomfield, CO (US)

( * ) Notice: Subject to any disclaimer, the term of this patent is extended or adjusted under 35 U.S.C. 154(b) by 172 days.

This patent is subject to a terminal disclaimer.

(21) Appl. No.: 18/350,938

(22) Filed: Jul. 12, 2023

(65) Prior Publication Data

US 2023/0411821 A1 Dec. 21, 2023

Related U.S. Application Data

(63) Continuation of application No. 17/727,565, filed on Apr. 22, 2022, now Pat. No. 11,742,562.

(Continued)

(51) Int. Cl.

*H01Q 1/28* (2006.01)
*H01Q 1/08* (2006.01)

(Continued)

(52) U.S. Cl.

CPC ............... *H01Q 1/08* (2013.01); *H01Q 1/288* (2013.01); *H01Q 11/105* (2013.01); *H01Q 19/04* (2013.01)

(58) Field of Classification Search

CPC .......... H01Q 1/08; H01Q 1/085; H01Q 1/087; H01Q 1/10; H01Q 1/103; H01Q 1/1235; H01Q 19/04

See application file for complete search history.

(56) References Cited

U.S. PATENT DOCUMENTS

| | | | |
|---|---|---|---|
| 4,262,293 | A | 4/1981 | Parmer |
| 7,911,406 | B2 | 3/2011 | Eckwielen et al. |

(Continued)

FOREIGN PATENT DOCUMENTS

| | | | |
|---|---|---|---|
| CN | 110718735 | A | 1/2020 |
| EP | 3764464 | A1 | 1/2021 |

(Continued)

OTHER PUBLICATIONS

International Searching Authority, United States Patent and Trademark Office, International Search Report and Written Opinion for Application No. PCT/US2022/026029, Mailed Date: Jan. 8, 2022, 12 Pages.

*Primary Examiner* — Daniel Munoz
(74) *Attorney, Agent, or Firm* — Holzer Patel Drennan

(57) ABSTRACT

A deployable antenna system for deployment in an extraterrestrial environment is provided, the deployable antenna system comprising a deployment mechanism including one or more extendable support structures comprising at least one axial support structure adapted to extend in a z-direction parallel to a z-axis in the deployable antenna system and a deployable antenna attached to the one or more extendable support structures and adapted to be stowed in an undeployed state and to be unfurled into a deployed state by the deployment mechanism, the deployable antenna being further adapted to extend and unfurl during deployment from the deployment mechanism in the z-direction responsive to extension of the at least one axial support structure, the deployable antenna including one or more flexible membranes coupled to the at least one axial support structure and extending from the z-axis in the deployed state.

48 Claims, 15 Drawing Sheets

Related U.S. Application Data

(60) Provisional application No. 63/179,003, filed on Apr. 23, 2021.

(51) Int. Cl.
*H01Q 11/10* (2006.01)
*H01Q 19/04* (2006.01)

(56) References Cited

U.S. PATENT DOCUMENTS

| | | | | |
|---|---|---|---|---|
| 10,276,926 | B2 | 4/2019 | Cwik et al. | |
| 11,742,562 | B2 | 8/2023 | Ruhl et al. | |
| 2018/0331433 | A1* | 11/2018 | Ceely | H01Q 11/10 |
| 2020/0231308 | A1 | 7/2020 | Ruhl et al. | |
| 2020/0411998 | A1 | 12/2020 | Mast et al. | |

FOREIGN PATENT DOCUMENTS

| | | | |
|---|---|---|---|
| GB | 1302644 | A | 1/1973 |
| GB | 2487391 | A | 7/2012 |
| WO | 2019231538 | A1 | 12/2019 |

* cited by examiner

DEPLOYABLE ANTENNA SYSTEM

CROSS-REFERENCE TO RELATED APPLICATIONS

The present application is a continuation of and claims benefit of priority to U.S. application Ser. No. 17/727,565, entitled "Deployable Antenna System" and filed on Apr. 22, 2022, which claims benefit of priority to U.S. Provisional Application No. 63/179,003, entitled "Collapsible Antenna System" and filed on Apr. 23, 2021, which is specifically incorporated by reference herein for all that they disclose and teach.

BACKGROUND

The use of log-periodic dipole array (LPDA) antennas has been historically limited or infeasible in space because the large size and/or weight of the LPDA antenna often outweigh its inherent benefits (e.g., extremely wide bandwidth and equal gain across frequency range). For example, some land-based LPDA antennas may be built from printed circuit boards or metallic assemblies, which tend to be rigid, non-collapsing, and/or heavy. These structures tend to be heavy and large and can exceed specified weight and/or size specifications for launch vehicles. Further, the rigid structures are susceptible to damage from gravitational forces and from vibrations exerted by a launch vehicle on the structures.

SUMMARY

In one implementation, an example spacecraft can operate in a high geostationary (GEO) orbit for an extended period (e.g., three years). The spacecraft can be equipped with a collapsible antenna system that includes a membrane-based log-periodic dipole array (LPDA), although such a collapsible antenna system may be employed in other space applications and spacecraft.

The improved technology described herein relates to a deployable antenna system for deployment in an extraterrestrial environment is provided. The deployable antenna system includes a deployment mechanism including one or more extendable support structures comprising at least one axial support structure adapted to extend in a z-direction parallel to a z-axis in the deployable antenna system and a deployable antenna attached to the one or more extendable support structures and adapted to be stowed in an undeployed state and to be unfurled into a deployed state by the deployment mechanism, the deployable antenna being further adapted to extend and unfurl during deployment from the deployment mechanism in the z-direction responsive to extension of the at least one axial support structure, the deployable antenna including one or more flexible membranes coupled to the at least one axial support structure and extending from the z-axis in the deployed state.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

In contrast to land-based log-periodic dipole array (LPDA) antennas, implementations of the described technology provide a deployable antenna including flexible membranes and support structures, although other deployable designs may be employed. Using flexible membranes in the deployable antenna, rather than thicker or continuously rigid substrates, the deployable antenna can be furled and stowed in a comparatively small volume for launch and transit. Flexible membranes of the deployable antenna may be one or more of collapsible, compactable, furlable, compressible, foldable, or rollable to reduce the volume of the deployable antenna. Upon deployment, the flexible membranes of the deployable antenna extend and expand to form an antenna considerably larger than a volume provided for stowing the deployable antenna in an extraterrestrial launch vehicle.

In an implementation, flexible membranes may include a thin sheet of material. In this implementation, portions of the flexible membranes may be rigidized by coupling or otherwise introducing rigid portions to the thin membranes. In an alternative implementation, the flexible membranes are at least partially composed of rigid or semi-rigid elements coupled to one another by flexible portions, the flexible portions providing flexibility to furl the rigid or semi-rigid elements.

Figure 1:
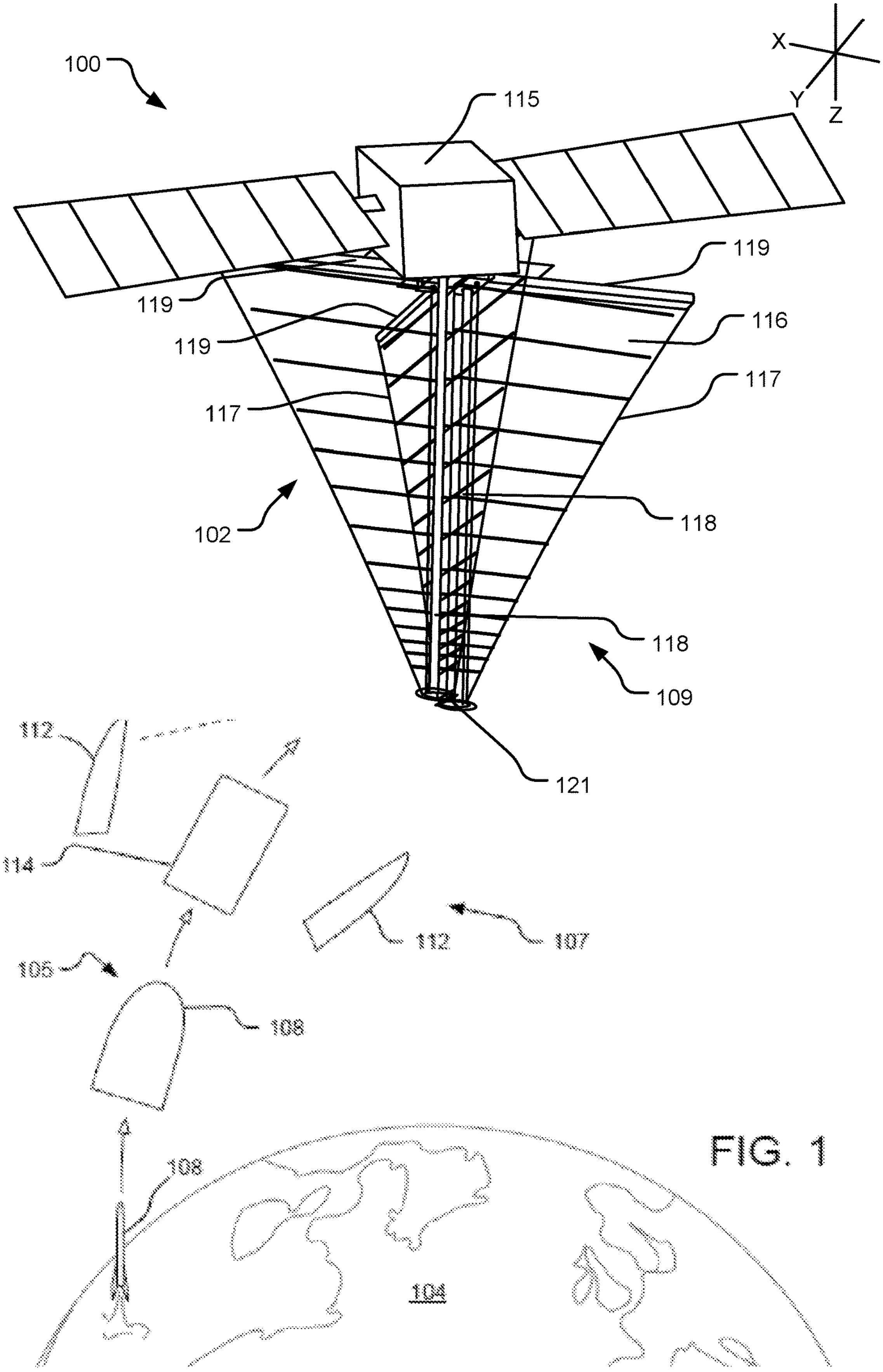
FIG. 1 illustrates an example environment 100 for use in deploying an implementation of deployable antenna system 102 in multiple phases.

FIG. 1 illustrates an example environment 100 for use in deploying an implementation of deployable antenna system 102 in multiple phases. The example environment 100 includes a celestial body 104 (e.g., the Earth or other astronomical object). In the example environment, a launch vehicle 108 launches from the Earth, typically with multiple stages. In one implementation, an engine stage is ignited at launch and burns through a powered ascent until its propellants are exhausted. The engine stage is then extinguished, and a payload stage separates from the engine stage and is ignited in a first phase 105. The payload is carried atop the payload stage into orbit in the first phase, contained within payload fairings 112 that form a nose cone to protect a launch vehicle payload against the dynamic pressure and aerodynamic heating during launch through an atmosphere.

In this first phase 105, the deployable antenna 116 of the deployable antenna system 102 is illustrated as stowed in a small-volume undeployed, furled state relative to the large-volume deployed, unfurled state shown in a subsequent phase. In implementations, the deployable antenna 116 is a membrane-based LPDA. In this case, the deployable antenna system 102 is smaller and is less massive than other deployable systems used for similar purposes. As used herein the term furled indicates that the deployable antenna is one or more of folded, rolled, and otherwise compacted. The term unfurled indicates that the deployable antenna is one or more of unfolded, unrolled, and otherwise expanded. The term "furlable" indicates that the deployable antenna is adapted to be furled. The term "unfurlable" indicates that the deployable antenna is adapted to be unfurled.

In FIG. 1, the deployable antenna system 102 is shown in a second phase 107 in the space environment, with the payload fairings 112 jettisoned from a launch canister 114 that contains the deployable antenna system 102 in a stowed or undeployed state, including a deployment compartment (not illustrated) and the deployable antenna 116. The deployable antenna 116 can be adapted to transmit, phase shift, and/or direct electromagnetic radiation in any portion of the electromagnetic spectrum (e.g., visible light, radio, microwave, infrared, ultraviolet, x-rays, gamma-rays, etc.). The deployable antenna 116 includes one or more flexible membranes 117.

As illustrated in a deployed state in phase 109, the deployable antenna system 102 includes a satellite body 115, a deployment compartment, and a deployable antenna 116. The deployment compartment may include an interface plate surface adapted to couple the deployment compartment to the satellite body 115 and may include a deployment base (e.g., at an end of the deployment compartment opposite an end including the interface plate) adapted to couple the deployment compartment to the deployable antenna 116. The deployable antenna 116 may include one or more extendable support structures 118 and 119 illustrated as composite tape struts (examples of compression struts). It should be appreciated that other support structures such as tensioned lanyards, truss booms, pullies, flexures, clamps, spring-tensioned cables, inflatable systems, coiled longeron booms, pantographic structures, or otherwise extendable structures are contemplated. As used herein, the term connection element means an intermediate connecting element including one or more of cable and lanyard assemblies (e.g., tensioned connections with pulleys and/or coupling members).

One or more of the satellite body 115 and the deployment compartment may include without limitation a variety of different subsystems, such as any combination of navigation subsystems, propulsion subsystems, control subsystems, communication subsystems, electromagnetic radiation (EMR) control circuitry, power subsystems, deployment subsystems, instrument subsystems, and any other payload subsystems. In implementations, the EMR control circuitry controls the transmission and/or reception of EMR signals. These subsystems may include a flight deployment controller to manage the payload prior to and throughout the deployment. The flight deployment controller may present a serial interface that provides critical configuration and status information on the system and allows simple commands to execute operations. The flight deployment controller may provide active thermal management for the motor drives in the deployers and may control actuator positions and sequencing to eliminate or reduce the possibility of adverse deployment geometries. The flight deployment controller can also manage the activation of the system release mechanisms and provides deployment status feedback. In implementations, the microcontroller at the core of the flight deployment controller implements triple mode redundancy (TMR) in the embedded software as well as error detection and correction (EDAC) techniques on all memory operations. In implementations, the microcontroller may be deactivated upon deployment of the deployable antenna 116 to the satisfaction of a deployment condition.

In an implementation, a deployment compartment coupled to the deployable antenna 116 may include and/or stow one or more of a flight deployment controller, an antenna deployment controller, EMR control circuitry, at least one axial support structure 118 deployer (e.g., a tape cassette or dispenser) at least one radial support structure 119 deployer (e.g., a tape cassette or tape dispenser), even when in the deployed, unfurled state in phase 109. In implementations, elements of the deployment compartment may include or may otherwise be integral with the launch canister 114. In implementations, the at least one radial support structure 119 deployer may be a single deployer with a common mandrel for some or all of the radial support structures 119 or may include a deployer for each of the radial support structures 119 in the deployable antenna system 102. Implementations are also contemplated in which the radial footprint of the launch canister 114 is sufficient to store the entire radial footprint of the deployable antenna 116 as deployed, such that the deployable antenna 116 does not radially expand upon deployment, and, therefore, the deployable antenna system 102 includes neither the radial support structures 119 nor the deployers thereof.

When in a stowed or undeployed configuration as in the first phase 105 and the second phase 107, the deployable antenna 116 may be furled to be stored within the launch canister 114. The satellite body 115 may be coupled to or may be at least partially integral to the launch canister 114. For example, in implementations, the satellite body 115 may be coupled to an interface plate of the deployment compartment or launch canister 114, such that the doors fold down to expose at least some of the contents of the launch canister 114 including one or more of the support structures 118 and 119, the deployable antenna 116, and the distal plate 121 to allow the deployable antenna 116 to deploy. One of the doors may be longer than the others as it includes the top of the launch canister 114, but implementations are also contemplated in which some or all of the doors are substantially the same (e.g., to maintain axisymmetry of the doors about the satellite body 115). In implementations in which the deployable antenna 116 does not expand radially, the door and lid assembly may be omitted in favor of a movable or removable lid that exposes the deployable antenna 116 to a space into which the deployable antenna 116 may deploy. The deployment compartment may include a superior or top portion with a surface that functions as a deployment base for the deployable antenna 116, on which the deployable antenna 116 rests, and/or at which the deployable antenna 116 is positioned when the deployable antenna system 102 is in the stowed or undeployed state.

The flexible membranes 117 of the deployable antenna 116 may intersect and be coupled with one another at the intersection. The intersection may include a support structure such as a rigid member or a tensioned support system. The intersection may also include conductive elements to couple antenna elements of the deployable antenna 116.

The deployable antenna system 102 may be furled and stored within the launch canister 114 prior to launch. The furling may be to reduce one or more of an axial or z-dimensional height and a radial or x-y dimensional footprint. In implementations, to place the deployable antenna 116 in a furled or undeployed state, the deployable antenna 116 is first furled to reduce the axial or z-dimension height. The first axial or z-dimension furling may include a z-fold. A z-fold configuration furling is a folding pattern that alternates between folding an initial portion or an already folded portion with alternating fold directions (see e.g., FIG. 7 for a description of z-folding) a still unfurled portion of the flexible membrane 117 to be furled. In implementations, this first z-fold configuration furling may form a flattened cruciform configuration or a staggered furl configuration of the deployable antenna 116. Even though the deployable antenna 116 has a staggered configuration when furled, the deployable antenna 116 may still have a cruciform radial cross-section when deployed.

The staggered furl configuration may arrange the flexible membranes such that, in implementations with two flexible membranes 117 that intersect at a central axis (e.g., to have a cruciform configuration when unfurled), a subordinate flexible membrane 117 is interleaved with a dominant flexible membrane 117 such that the interleaving includes more material from the subordinate flexible membrane 117 than from the dominant flexible membrane 117. For example, the subordinate flexible membrane 117 includes portions furled both radially and axially within axial furls of a dominant flexible membrane 117 using diagonal furls in the subordinate flexible membrane 117. After the first axial furl, both sides of a dominant membrane of the flexible membranes 117 are aligned at an intersection between the dominant flexible membrane 117 and the subordinate flexible membrane 117 (e.g., at a central axis of the deployable antenna), but the sides of a subordinate flexible membrane 117 of the flexible membranes 117 are staggered at the intersection.

The staggering may be axisymmetric relative to a central axis of the deployable antenna 116. The staggering may maintain the physical coupling between the flexible membranes 117 at the intersection of the flexible membranes 117 when in a furled state. In implementations, when furled, each furl (e.g., fold, crease, wrap, bend, or wrinkle) of the dominant membrane contains an extra layer of material of the subordinate membrane when in the furled state. In other implementations, when furled, alternating furls or furls at other intervals of the dominant membrane contain more than two material layers of the subordinate membrane when in the furled state. To facilitate the furls of the subordinate flexible membrane, diagonal furls in the subordinate flexible membrane 117 may be used (see e.g., diagonal furling discontinuities 639 in FIG. 6). After the first z-folding is conducted to form the staggered furl configuration, the radial longitudinal length of the subordinate membrane may be less than the radial longitudinal length of the dominant membrane (because radial portions of the subordinate membrane are doubly layers within single layer z-folds of the dominant membrane).

Figure 8:
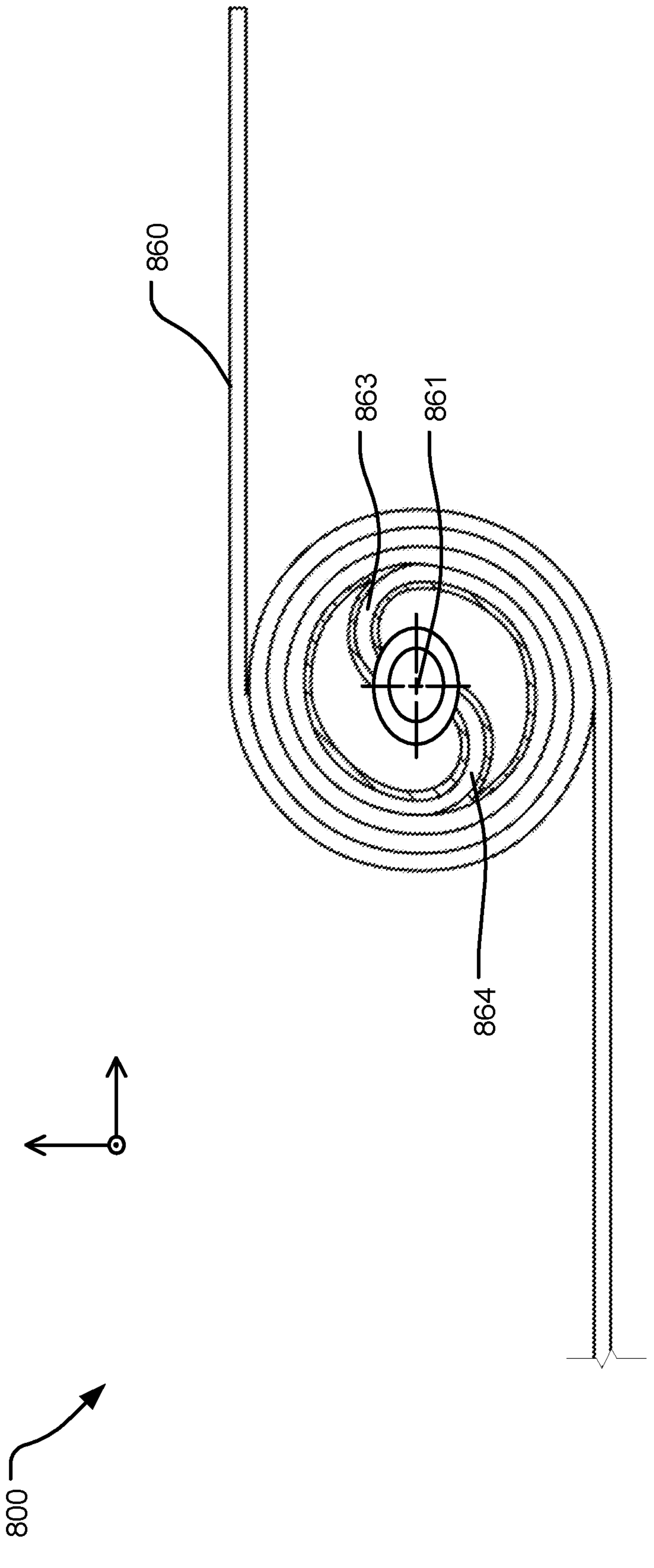
FIG. 8 illustrates another implementation of a furling arrangement to reduce a stowed axial or radial footprint.

In implementations in which the radial or x-y dimensional footprint (e.g., cross-sectional area) of the deployed deployable antenna 116 is too large to stow in the canister, a second furl may subsequently be performed. The second furl may include one or more of a z-fold furling configuration or a rolled folding configuration (e.g., a yin-yang or rolled configuration as illustrated in FIG. 8) furl as described herein to reduce the radial or x-y dimensional footprint. This second furl may further stack elements in the axial or z-dimension that already have been furled in the first furl. The stacking may increase the axial or z-dimension height of the deployable antenna 116 relative to the axial height of the deployable antenna after the first furl in the undeployed or stowed state. In implementations in which the first axial furl forms a staggered furl configuration, the subordinate membrane may be furled less in a second radial furl than the dominant membrane (e.g., because the dominant membrane extends radially further than the subordinate membrane in the staggered furl configuration). In the staggered furl configuration, the dominant and subordinate membranes may have the same or different longitudinal radial lengths after the second furl.

Deployment of the deployable antenna 116 may include exposing the deployable antenna by opening doors in the launch canister 114 (e.g., ones integral to the satellite body 115). When deploying the deployable antenna 116, the flexible membranes 117 may be unfurled in a particular order or may be conducted over overlapping periods of time or concurrently. In implementations, an order of unfurling includes radial unfurling in the radial x-y plane by extending the radial support structures 119. In implementations in which the radial footprint is sufficiently large to accommodate an entire radial cross-section of the undeployed deployable antenna, there may be no radial furl to unfurl, eliminating the first unfurling in the radial direction. The next step in the order of unfurling (or the first step in implementations in which there is no radial unfurling) may include an axial z-direction (e.g., parallel to a z-axis) unfurling by extending the axial support structures 118. In implementations, the z-axis is substantially orthogonal to a surface of a deployment base of a deployment compartment.

The deployable antenna system 102 is shown in a deployed state in which the deployable antenna 116 has been expanded to a larger area relative to the size of the deployable antenna 116 in its undeployed state. Terminal ends (e.g., ends as described herein such as radial or x-y dimension ends and/or terminal vertical or z ends) of the deployable antenna 116 flexible membranes 117 deploy away from the satellite body 115 with the use of motorized and/or mechanical tape deployer assemblies (not illustrated), which are mechanically or electronically synchronized to work in concert deploying and tensioning the deployable antenna 116 flexible membranes 117. The extendable support structures may deploy in compression to balance the tension loads of the membrane. In implementations, tensioned lanyards or cables are attached at one or more tape/membrane interfaces. In implementations, the membrane/tape interfaces further include a spring tensioning system to afford compliance of the structure while maintaining the desired membrane tension for electromagnetic radiation transmission and/or reception performance.

In the illustrated example, composite tape struts include one or more of radially (e.g., horizontally in an x-y reference plane and/or from ends of a cruciform footprint) extendable radial support structures 119 and axially (e.g., vertically in a z-direction) extendable axial support structures 118 that extend outwardly from the satellite body 115 to unfurl the flexible membranes 117 to transition the deployable antenna 116 from its undeployed or stowed state to its deployed state. In implementations, the flexible membranes 117 are furled axially (e.g., in a vertical, axial, and/or z-direction) in the stowed state and are deployed by extending axial support structures 118 axially (e.g., axially in a z-direction). The axial support structures 118 may be coupled to axially distal (e.g., substantially axially terminal) positions of the flexible membranes 117 (when unfurled) directly (e.g., using cables or lanyards) or via a distal plate 121. Implementations are contemplated in which the canister 114 has a large enough radial or x-y dimension space such that no radial or x-y dimension extension is conducted, allowing the radial support structures 119 and other elements that expand the deployable antenna radially to be omitted from the deployable antenna system 102 in favor of static connecting elements. x, y, and z dimensions are illustrated for reference. In implementations, the radial support structures 119 are mounted around a common spool and/or in a common mandrel. This approach can provide mechanical synchronization of the radial booms in an efficient package and enables the use of a single rate-control damper, if necessary.

In implementations, the flexible membranes 117 are additionally or alternatively furled radially in the stowed state and are deployed by extending radial support structures 119 coupled to radially distal (e.g., substantially radially terminal) positions of the flexible membranes 117 (e.g., by cables or lanyards) to deploy the deployable antenna 116 axially. Furling the flexible membranes of the deployable antenna 116 in the stowed state one or more of axially and radially facilitates a more compact stowed deployable antenna system 102. The compact size can allow the satellite to be deployed more cost-effectively than systems that cannot similarly furl. As described herein, substantially terminal positions indicate that the positions are within a predefined distance of a terminal end as described. Proximal positions of the flexible membranes 117 (e.g., positions within a predefined distance of a terminal proximal end of the flexible membranes 117) may be coupled one or more of to a deployment base at a superior position of the deployment compartment and to proximal portions of the axial support structures 118 and/or the radial support structures 119. The proximal couplings may be direct or may be via one or more of cables and lanyards.

As the support structures 118 and 119 extend, the ends of support structures 118 and 119 push and/or pull to unfurl the flexible membranes 117 to transition the deployable antenna 116 from its undeployed state to its deployed state. In the deployed state, the flexible membranes 117 may be extended to a substantially planar and/or flat arrangement. For the purposes of this specification, substantially planar or substantially flat may mean that points on all or a portion of the deployed flexible membranes diverge by less than a predefined distance in a plane (e.g., the plane defined by the peripheral edges of each of the flexible membranes 117) or a predefined angle relative to an edge (e.g., an edge among the peripheral edges of each of the flexible membranes 117). For example, predefined distances may be between any or be one or more of 1 millimeter (mm), 2 mm, 3 mm, 4 mm, mm, 6 mm, 7 mm, 8 mm, 9 mm, 1 centimeter (cm), 1.5 cm, 2 cm, 3 cm, 4 cm, 5 cm, 10 cm, cm, 20 cm, 25 cm, and 30 cm. Predefined angles may be between any or be one or more of 1°, 2°, 3°, 4°, 5°, 6°, 7°, 8°, 9°, 10°, 15°, 20°, 25°, 30°, and 35°. These parameter values are presented for purposes of demonstration, but implementations of the technology presented herein are not limited to the demonstrative parameter values.

Each axial support structure 118 may be deployed in synchronicity where each of the axial support structures 118 are the same axial length such that when the deployable antennal 16 is fully deployed, each axial support structure 118 extends the same length from satellite body 115 at the same time. Each radial support structure 119 may be deployed in synchronicity where each of the radial support structures 119 is the same axial length. In implementations, when the deployable antenna 116 is fully deployed, each radial support structure 119 extends the same length from the deployment compartment at the same time. In this case, the deployed state of the deployable antenna 116 may be symmetric about the deployable antenna system 102, with the mass of the deployable antenna 116 and the deployable support structures being substantially evenly distributed about the deployable antenna system 102. In other implementations, the deployment may be asymmetric, such as with different lengths of axial support structures 118 and/or different lengths of radial support structures 119. Although illustrated as having multiple axial support structures 118 and multiple radial support structures 119, implementations are contemplated in which the deployable antenna system 102 includes a single axial support structure 118 and/or a single radial support structure 119.

In the illustrated example, the support structures 118 and 119 may be a variety of support structures that extend from satellite body 115. Support structures 118 and 119 may be or include bi-stable tapes that can be unrolled to deploy and provide support for the deployable antenna 116. For example, deployers (e.g., tape dispensers, not illustrated) associated with each support structure 118 and 119 may be included as part of the deployable antenna system 102. Upon deployment of deployable antenna system 102, deployers may deploy the support structures 118 and 119 (e.g., composite tape support structures) from a rolled to an unrolled state. In this example, the tapes may be carpenter-style tapes where the tapes extend (e.g., unroll from the deployers or dispensers) to expand the deployable antenna 116 to its deployed state and provide structural rigidity to the deployed state of the deployable antenna 116.

In implementations, tension lanyards (not illustrated) may be affixed to or near a peripheral region at the perimeter of the expanded form of the deployable antenna 116 (e.g., the same points of attachment as the distal ends or portions of the support structures 118 and 119 relative to the satellite body 115). In these implementations, when unfurling the deployable antenna 116, the tension lanyards can provide tension to pull the flexible membranes 117 taut to a substantially planar arrangement (e.g., in a plane partially defined by the illustrated z-axis). These tensioning devices may include springs, pulleys, rollers, or other tensioning devices. These devices can be attached to the same locations near a periphery region at the perimeter of the expanded form of flexible membranes 117 where the support structures 118 and 119 are coupled (e.g., at a distal plate 121 or at a deployment base defined by the satellite body 115) and can provide tension to the tension lanyards and cause the expanded form of the flexible membranes 117 to be pulled to a substantially flat arrangement.

Additional tensioning devices (not shown) may also be connected to the proximal ends or portions of the support structures 118 and 119 (e.g., the connection point of the composite tape support structures 118 and/or 119 to satellite body 115). These tensioning devices may also include springs, pullies, rollers, or other tensioning devices. These tensioning devices may also be connected to the proximal ends or portions of tension lanyards and may also provide tension to the tension lanyards and cause the expanded form of deployable antenna 116 to be pulled to a substantially flat, planar arrangement. In implementations, as illustrated, one or more of the substantially flat, planar surfaces of the flexible membranes 117 may be substantially orthogonal to a surface of the satellite body 115 that faces the deployable antenna 116. Consistently, one or more of the flexible membranes 117 may include a planar surface that is substantially orthogonal to the x-y reference plane.

In implementations in which the deployable antenna 116 is an LPDA antenna, the substantial flatness of the flexible membranes 117 may be less crucial than in other systems, as the effectiveness of the deployed deployable antenna 116 is based on the spacing between antenna elements rather than the nature of the surfaces of the flexible membranes 117 (which could be more crucial in systems where membranes are used as reflectors or lenses). That is, in implementations in which the deployable antenna 116 is an LPDA, the flexible membranes 117 may be deployed, unfurled, and/or tensioned to ensure that spacing between the antenna elements satisfies a predefined antenna element spacing condition.

In some cases, the satellite body 115 includes solar panels and/or instrumentation, which may include one or more of a variety of instruments, including antenna circuitry. The antenna circuitry may communicate energy (e.g., provide or receive) with the deployable antenna 116 to cause the deployable antenna to emit and/or receive radiofrequency (RF) waves, infrared (IR) frequency waves, ultraviolet (UV) frequency waves, x-ray frequency waves, visible light frequency waves, or other energy frequency waves. The instrumentation may be configured to provide energy to the deployable antenna 116 to emit a beam of radiofrequency energy or other electromagnetic radiation. Such electromagnetic radiation or other electromagnetic radiation may be used to communicate signals between devices on the celestial body 104 and the deployable antenna system 102. For example, the transmissions may be conducted one or more of at ultra-high frequency (UHF), in the S-Band, and in the L band frequencies.

In implementations in which the deployable antenna 116 is an LPDA, one or more of solar panels, circuit boards, electromagnetic radiation (EMR) control circuitry, rigid portions, or semi-rigid portions may be integral to or coupled to the flexible membranes 117 (e.g., between antenna element portions). An LPDA relies on the antenna elements and their relative spacing rather than the electromagnetic properties of the flexible membranes 117 themselves to transmit and receive signals.

As used herein, in implementations with one or more of rigid portions and semirigid portions, rigid portions can be distinguished from semi-rigid portions in that rigid portions are substantially inelastic and semi-rigid portions are elastic but less flexible than the flexible material of thin membranes and/or flexures used to make the flexible membranes 117 flexible between the semi-rigid portions.

The flexible membranes 117 may include antenna elements composed of a conductive material. In implementations, the antenna elements may include one or more of integral and inlaid conductive elements embedded in etchings or otherwise embedded in the flexible membranes 117 and/or rigid or semi-rigid elements coupled or integral thereto. In other implementations, the antenna elements may be conductive rods. In implementations with the conductive rods, if the rods are sufficiently resilient, flexible membranes 117 may be omitted in favor of other structural support elements such as trusses, lanyard pulley systems, and/or telescoping antenna element rods that selectively deploy without external support.

In implementations in which the deployable antenna 116 is an LPDA antenna where each of the flexible membranes 117 has sub-membranes, the distal-most conductive elements (e.g., distal-most in an axial or z dimension) may be electrically coupled with EMR control circuitry via EMR circuitry couplers. The electrical connectivity between the distal-most antenna elements and more proximal antenna elements may alternate between sides of each flexible membrane 117 in an alternating antenna element coupling configuration. For example, a first sub-membrane of a flexible membrane 117 may include a first antenna side and a second antenna side divided by a central antenna axis coincident with or offset from but parallel to a central axis of the sub-membrane (e.g., along an axis parallel to the axial or z-axis and central within the radial or x-y plane projection of the flexible membrane 117). Each of the first side and the second side of the first sub-membrane may include antenna elements, that alternate about the central antenna axis at progressive z-axis positions. In this implementation, a second sub-membrane of the flexible membrane may include antenna elements arranged to have mirror symmetry about a central membrane axis relative to the antenna elements of the first sub-membrane. The alternating antenna element coupling configuration forms an LPDA antenna.

Alternative antenna element coupling configurations are contemplated. For example, several antenna elements on the flexible membranes could each be directly coupled to EMR circuitry to form a phased array. Other antenna types that can be formed by arranging antennas on the flexible membranes 117 include reflectarray antennas, other reflector antennas, other array antennas, and the like.

The deployable antenna system 102 may include a first EMR circuitry coupler electrically coupled to a first distal-most antenna element of the first sub-membrane on the first side. The first distal antenna element may be further electrically coupled with a second-most distal antenna element on the second side. The second-most distal element on the second side may be further electrically coupled with a third-most distal element on the first side. The couplings may continue to alternate between sides (e.g., until there are no more proximal antenna elements to which to couple) in the alternating antenna element coupling configuration. The arrangement of antenna elements of the second sub-membrane may have mirror symmetry about a central membrane axis relative to the elements on the first submembrane. The first sub-membrane may be coupled to EMR circuitry via a first connector and the second sub-membrane may be coupled to EMR circuitry via a second connector. In an implementation, the EMR circuitry is coupled to each of the sub-membranes by electrically insulated and/or isolated conductive lines.

The flexible membranes 117 may be composed of a flexible material and/or may comprise rigid or semi-rigid portions coupled to one another by flexible elements (e.g., flexures composed of flexible materials such as poly (4,4'-oxydiphenylene-pyromellitimide) or other polyimide films). Alternatively, the flexible elements may be elements of membrane surfaces to which the rigid or semi-rigid portions are coupled rather than separately coupled flexures. The flexibility may allow for furling of the flexible membranes 117 to facilitate better packing for stowed configurations. In implementations with rigid or semi-rigid portions, the antenna elements may be coupled to or integrated into the rigid or semi-rigid portions. The integration may be by cutting or etching ridges into a surface of the rigid or semi-rigid portions and then introducing a conductive material to the ridges. The rigid or semi-rigid portions may include one or more of circuit boards and solar cells. The rigid or semi-rigid portions may include (e.g., exclusively or predominantly) electromagnetically insulating material in order to avoid or mitigate interference with the deployable antenna's 116 performance. In implementations, the rigid portions may be integral to the deployable antenna 116 at positions used for higher frequencies (e.g., positions that generate at least a predefined frequency) that benefit from deploying to a flatter surface (e.g., ones with lower fault tolerances that are less practically effectuated by tensioning the flexible membrane materials).

The flexible membranes 117 may be furled in a predetermined manner such that furling discontinuities (e.g., creases, wrinkles, or folds) in the flexible membranes 117 may be located at predetermined positions based on a predefined furling procedure and/or configuration. Introducing furling discontinuities to antenna elements may stress the antenna elements, so minimizing the overlap and/or intersection of the furling discontinuities and the antenna elements may mitigate some of the effects of the stress the furling imposes on the antenna elements. Further, if the furling pattern is predefined and if the locations of the furling discontinuities relative to the antenna elements are known, the antenna elements can be reinforced at intersections or overlaps between the furling discontinuities and the antenna elements prior to furling that places the deployable antenna 116 into a stowed or undeployed configuration.

Furls can cause stress to antenna elements, and furl resilience elements can be introduced to portions of a flexible membrane 117 where furling discontinuities intersect or otherwise overlap with antenna elements. The furl resilience elements can include reinforced conductive elements (e.g., by adding more conductive material), furling guides, conductive flexures, and the like. In implementations in which the antenna elements include conductors that are inlaid, embedded, or otherwise integrated into the flexible membranes 117, the antenna elements may be reinforced by introducing more conductive material to make the antenna elements more resilient to stress while maintaining the conductive and/or electromagnetic emission properties of the antenna elements. Additionally or alternatively, furling guides may be introduced at furls to maintain a predefined minimum furling radius to minimize stress to the antenna elements at intersections between furls and antenna elements. Examples of furling guides include non-conductive rods or tubes. In implementations in which the antenna elements include rods, the rods may have preconfigured flexures or junctions at the intersections or overlapping portions between the furling discontinuities and the antenna elements that provide local flexibility while maintaining the conductive and/or electromagnetic emission properties of the antenna elements. In implementations in which a flexible membrane 117 includes rigid or semirigid portions with flexible portions between the rigid or semi-rigid portions, antenna element portions that reside on or cross the flexible portions may be reinforced. In the same or alternative implementations, the rigid elements are joined at intersections with solder or welds for intersections that remain rigid throughout the transition of the deployable antenna system 102 from a stowed state to a deployed state. In these implementations, one or more furling positions in the flexible membranes 117 may include a conducting flexure.

Some of the furling discontinuities may be arranged horizontally or radially (e.g., substantially within the x-y reference plane) to allow for folding the flexible membranes 117 (e.g., when the folding membranes are fully radially extended) to reduce the footprint of the deployable antenna 116 in the z-dimension. The horizontal furling discontinuities may be longer than other furling discontinuities, so it may be advantageous to stagger the horizontal discontinuities relative to antenna elements (e.g., especially, horizontally arranged antenna elements that may have large overlaps or intersections). In some implementations, the furling discontinuities may be at least partially vertical (e.g., extend at least partially in the z-dimension), such as diagonal (relative to the z-dimension and one or more of the x and y dimensions) furling discontinuities (e.g., ones in a staggered furl configuration) resulting from diagonal furls. It may not be feasible to stagger the antenna elements between the diagonal furling discontinuities, so the design of the deployable antenna 116 may reduce any overlap or intersection between the diagonal furling discontinuities and the antenna elements and/or may mitigate the furling effects by reinforcing the antenna elements are the overlapping or intersecting portion(s) with furl resilience elements. In implementations in which the deployable antenna 116 is furled to reduce the radial or x-y plane footprint, the flexible membranes 117 may further include substantially vertical furling discontinuities that are substantially parallel with the z-axis.

A number of configurations of the deployable antenna 116 are contemplated. The deployable antenna 116 may include any number of flexible membranes 117 including the two illustrated in FIG. 1 or more. Further, each of the flexible membranes 117 can be formed in any number of shapes when unfurled including a circle, an ellipse, a triangle, a square, a rectangle, a trapezoid, a rhombus, a pentagon, a hexagon, a heptagon, an octagon, a nonagon, a decagon, an undecagon, a dodecagon, another polygon (e.g., having any number of sides with the same size and any angles therebetween of different or same magnitudes), a curvilinear shape, a cruciform shape, a V-shape, a Y-shape, or substantial variants thereof (e.g., substantially polygonal but with sides that have curvilinear or catenary edges). The sides of the shapes may be straight In implementations, the deployable antenna 116 may be axisymmetric about a central axis. In implementations, a width of a flexible membrane 117 in the radial or x-y dimension plane reduces as the distance in the axial or z-dimension from the satellite body 115 increases.

In the illustrated implementation, the flexible membranes 117 are substantially trapezoidal when unfurled and intersect at a common central axis about which the deployable antenna 116 has substantial axisymmetry. The two intersecting flexible membranes 117 may be interleaved at the intersection. The two flexible membranes 117 may define four corners at the intersection. The two flexible membranes 117 may have a cruciform-shaped cross-section in the x-y reference plane when unfurled. Similarly, the radial support structures 119 may have a substantially cruciform shape in the x-y reference plane and may extend symmetrically radially during deployment such that the radial support structures 119 extend to a larger substantially cruciform shape in the x-y reference plane.

In implementations, each of the flexible membranes 117 may be a membrane assembly including two or more sub-membranes separated by a space of a predefined dimension (e.g., width or distance between the membranes). The space may be unoccupied by elements of the deployable antenna system 102 at least in some portions. Implementations are contemplated in which rigid elements may occupy at least some of the space. In these implementations, the intersection between the two flexible membranes 117 may have a greater volume than if the flexible membranes 117 were single membrane assemblies. In these implementations, the sub-membranes may be of the same or different shapes, of the same or different sizes, and/or coincident or staggered from a perspective orthogonal to planar surfaces of the sub-membranes when unfurled or deployed. The membrane assemblies may also form a deployable antenna 116 with substantial axisymmetry. In implementations in which each of the flexible membranes 117 has a membrane subassembly of two sub-membranes with a predefined distance therebetween (at least at a predefined position near the intersection of the flexible membranes 117), the individual sub-membranes of the membrane subassemblies may appear to have a cross-section in the x-y reference plane that substantially resembles a pound sign or hashtag at least near the intersection of the flexible membranes 117. The predefined dimension of the space between the sub-membranes may be substantially the same for both of the subassemblies to establish axisymmetry. In implementations, the sub-membranes are coupled to opposite sides of rigid or semi-rigid elements. In implementations, the thickness of the rigid or semi-rigid elements represents the width of the space between the sub-membranes.

EMR circuitry couplers (e.g., coaxial or other electronic cables) may be provided from the satellite body 115 (e.g., in a spool) at one or more of the corners defined by the flexible membranes 117. The electrical cables may electrically couple antenna circuitry in the satellite body 115 with the antenna elements of the flexible membranes 117. In implementations, the EMR circuitry couplers are physically coupled (whether directly or via cables or lanyards) to one or more of an axially distal position of the flexible membranes 117, the distal plate 121, and axial support structures 118 and are axially extended during deployment by extending the axial support structures 118 axially. In implementations with more than one EMR circuitry coupler, EMR circuitry couplers may be arranged in the corners while maintaining substantial axisymmetry about the central axis of the deployable antenna 116. For example, in deployable antenna systems 102 with four corners (as illustrated) and two EMR circuitry couplers, the two EMR circuitry couplers may be arranged in corners opposite one another (e.g., cater-corner or diagonally opposite one another in a radial or x-y reference plane). In deployable antenna systems 102 with four corners and four EMR circuitry couplers, each of the EMR circuitry couplers may be positioned in a different corner.

An implementation of the deployable antenna system 102 includes two orthogonal log-periodic dipole arrays (e.g., full-panels) that are interleaved together (e.g., at central positions to form an axisymmetric deployable antenna 116). A hybrid coupler (e.g., in the satellite body 115 or in the deployment compartment) can be used to manipulate the orthogonal LPDA signals to form a single-phase center aperture, which will help to enable circularly polarized radiation patterns with a low axial ratio. The antenna elements (e.g., including C-band copper array elements) can be etched on flexible membranes 117 comprising thin polyimide membranes. The two individual linear log-periodic radiating structures may be fed with individual 500 feeder lines. This independent dual, orthogonal linear-polarized configuration can form any desired polarization. The design may be configured to provide a performance as shown in Table 1.

TABLE 1

Antenna Performance Summary

| Property | Performance |
|---|---|
| Gain from 100 MH z to 1000 MHz | >5.3 dBi |
| Polarization | Right-Handed Circular Polarization (RHCP) |
| Impedance | 50 Ohm |
| VSWR (Voltage Standing Wave Ratio) | <1.4 |
| Half-Power Beamwidth at 100 MHz | ~89 deg |
| Half-Power Beamwidth at 1000 MHz | ~102 deg |
| Power Capacity | 50 W |
| Stowed Volume | 20 × 20 × 30 cm |

When deployed, a satellite orientation system may orient the deployable antenna system 102 to direct the deployable antenna 116 towards an object of interest (e.g., an object on a celestial body or on an artificial craft). This may include directing the deployable antenna such that the z-direction points towards the object of interest. The object of interest may be a transmitter or receiver configured to exchange EMR signals with the deployable antenna system 102.

In an implementation, during deployment, two axial support structures 118 extend along the z-axis from the canister 114 to deploy the deployable antenna 116 in that direction (e.g., to a height of 2.1 m). In the illustrated implementation, the radial support structures 119 and the axial support structures 118 are extended during deployment to deploy the deployable antenna 116 in each direction (e.g., to a width of 1.6 m). The radial support structures 119 are deployed by a quad tape deployer, although smaller tape deployers may be employed (e.g., two dual tape deployers). In other implementations, one or more of the radial support structures 119 may be omitted. In implementations, a first flexible membrane 117 along the x-axis is threaded through the flexible membrane 117 along the y-axis and/or vice versa, at their intersection near the axial support structures 118.

In another implementation, the deployable antenna system 102 includes four orthogonal log-periodic dipole arrays (e.g., one LPDA in each of two sub-membranes of two flexible membranes 117). Rather than interleaving the full panels of the previous configuration, this implementation may use electrical jumpers to electrically connect one sub-membrane to a corresponding sub-membrane on the other side of the z-axis.

Other implementations may employ mesh substrates with discrete wires or discrete rigid panels connected by a membrane or mechanical hinges. In implementations, the flexible membranes 117 may include one or more of the membrane antennas, mesh substrate antennas, and discrete rigid panel antennas.

In one implementation, the flexible membranes include inlaid antenna elements comprised of copper deposited in etchings in a polyimide thin-film material. The copper surfaces are etched to create a predefined antenna element pattern. A proprietary static-dissipative coating may be applied to the etched membrane to provide favorable thermal-optical properties and, when used in low earth orbit, may protect the inlaid antenna elements from atomic oxygen.

In an implementation, one or more of the support structures 118 and/or 119 include tape boom technology that enables high compaction ratios for deployable structures and is an effective complementary technology to membrane antennas since the thin films are tensioned by a structure during operation. The high-strain and bi-stable nature of the composite tape booms allow them to be easily furled into a very small package but to deploy to form a very stiff and/or determinate structural boom. These support structures 118 and/or 119 can be employed in multiple applications in both passive (stored-energy-driven) and active (e.g., motorized)

deployment systems. In implementations, the axial or x-y plane cross-section (e.g., looking down the length of the boom may be open or closed, forming any of a number of cross-sectional shapes at the intersection between the flexible membranes 117.

In implementations, the support structures 118 and/or 119 may be motorized or may be configured to self-deploy following release from the system launch restraint by tension stored in the support structures 118 and/or 119. Nevertheless, in other implementations, various configurations of motorized and/or self-deploying support structures 118 and/or 119 may be employed. For example, support structures 118 and/or 119 may alternatively be extended by a number of motorized slit-tube assemblies (e.g., by four electronically synchronized motors).

Figure 2:
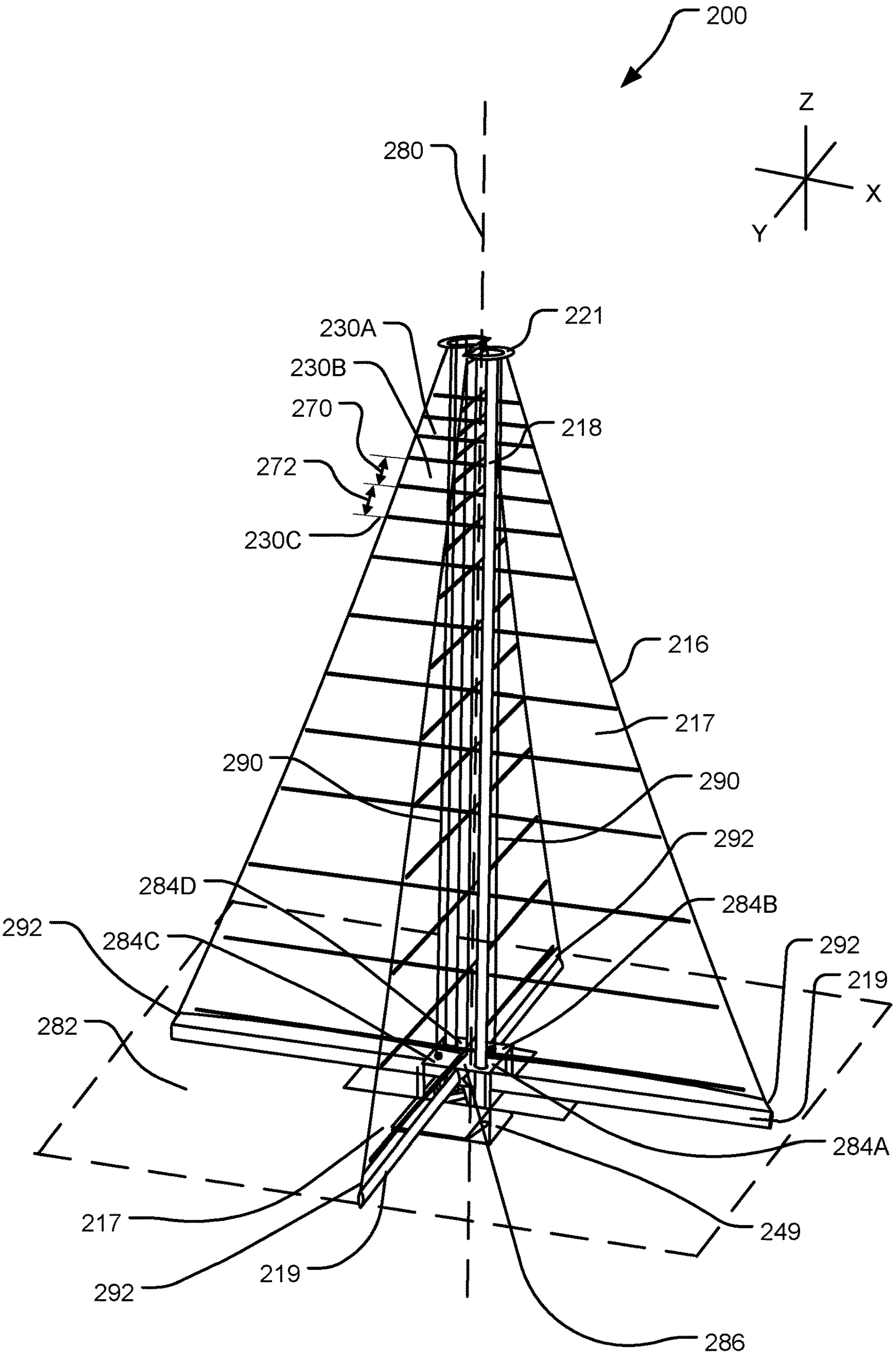
FIG. 2 illustrates an implementation of a deployable antenna system in a deployed state.

FIG. 2 illustrates an implementation of a deployable antenna system 200 in a deployed state. In this illustrated implementation, the deployable antenna 216 includes two flexible membranes 217 that intersect and/or are coupled at a central axis 280 (e.g., one parallel to the y-axis as illustrated). The intersecting flexible membranes 217 may define corners 284A-284D. As illustrated, axial support structures 218 extend from cater-corner corners 284A and 284D. Implementations are contemplated in which one or more axial support structures 218 extend from each of the corners (e.g., 284A-D) defined by any number of flexible membranes 217 intersecting. Proximal portions of the axial support structures 218 may be coupled to dispensing elements in the deployment compartment 249. Distal portions of the axial support structures 218 may be coupled directly or via a connecting element to one or more of the distal plate 221 and the flexible membranes 217.

As illustrated, EMR circuitry couplers 290 extend axially from cater-corner corners 284B and 284C. In implementations, the deployable antenna system 200 may include a different number of EMR circuitry couplers. For example, the deployable antenna system 200 could include EMR circuitry couplers 290 that extend from each of the corners 284A-D. The EMR circuitry couplers 290 may be dispensed from EMR circuitry coupler dispensing elements such as spools. The EMR circuitry coupler dispending elements may be coupled to a deployment base 286 of the deployment compartment 249, e.g., at one or more of the corners 284A-D. The EMR circuitry coupler dispensing elements may alternatively be located within and/or coupled to an interior element of the deployment compartment 249. The deployment base 286 may define an axially superior surface of the deployment compartment 249.

The spacing in the axial or z-dimension between the antenna elements 230 (e.g., antenna elements 230A-C) may be uniform or may vary between adjacent antenna elements 230. For example, a first distance 270 between a first antenna element 230A and a second antenna element 230B may be different from (e.g., greater or less than) or the same as a second distance 272 between the second antenna element 230B and a third antenna element 230C. Implementations are also contemplated in which some distances between antenna elements 230 are the same and others are different. The distances between antenna elements 230 may follow a trend relative to the axial or z-direction. For example, distances between antenna elements 230 may increase or decrease with distance in the axial or z-direction from the deployment compartment 249.

The deployable antenna 216 may include one or more radial support structures 219 that extend substantially within a radial or x-y plane 282. The radial support structures 219 may extend radially away from the central axis 280 when deploying. The radial support structures 219 may deploy from an interior of the deployment compartment 249 (e.g., from one or more mandrels or cassettes). In implementations in which a launch canister has a sufficient radial footprint to accommodate the radial dimensions of the deployable antenna 216, the radial support structures 219 may be omitted in favor of static couplers that statically couple the flexible membranes 217 to the deployment base of the deployment compartment 249.

One or more of the axial support structures 218 and radial support structures 219 may be coupled to the membranes or distal plate 221 by connecting elements 292. As illustrated, the radial support structures 219 are coupled to radially distal portions of the flexible membranes. Although not illustrated, portions of the flexible membranes 217 substantially proximal (e.g., within a predefined distance) to the central axis 280 may be coupled to the deployment base 286 or a different part of the deployment compartment 249.

Figure 3:
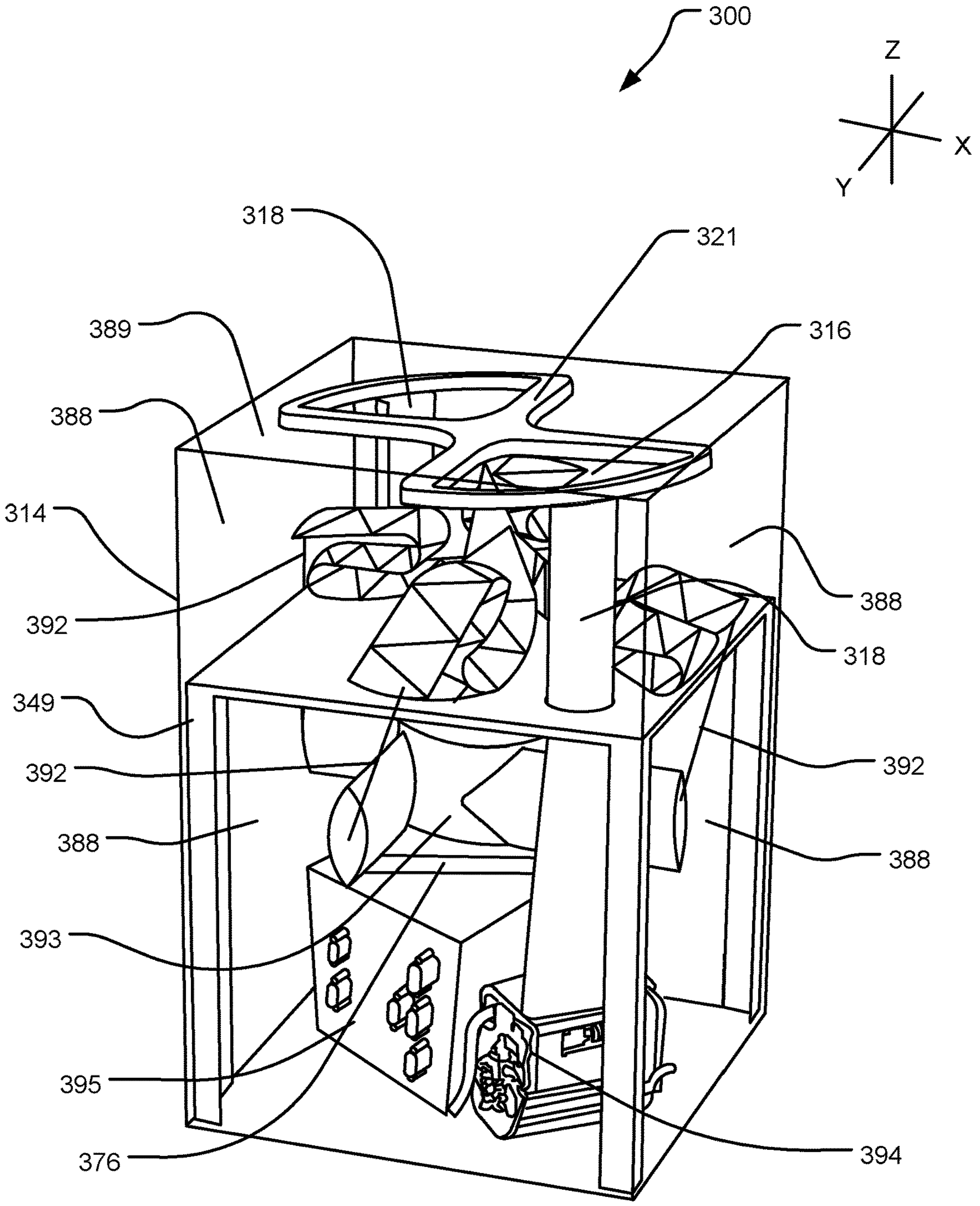
FIG. 3 illustrates an implementation of a deployable antenna system in a stowed state.

FIG. 3 illustrates an implementation of a deployable antenna system 300 in a stowed state. In the stowed state, elements of the deployable antenna system are contained within a launch canister 314. In the illustrated implementation, a deployment compartment 349 is integral to the launch canister 314. The launch canister 314 includes doors 388 that move (e.g., one or more of fold, roll, and slide between a closed and open configuration) to allow the deployable antenna 316 to deploy and/or unfurl. The launch canister 314 may also include a lid 389 that may also move with the doors 388 to expose the deployable antenna 316 and allow for it to extend in axial and/or radial directions. In implementations in which the radial footprint of the undeployed deployable satellite fits within the launch canister 314, doors may be omitted in favor of a lid 389 that moves to expose a space into which the deployable antenna 316 deploys axially.

In the illustrated implementation, the launch canister 314 is an element of a deployment compartment 349 of the deployable antenna system 300. The deployment compartment 349 has a top or superior surface that is a deployment base 386 from which the deployable antenna 316 is deployed. The deployment compartment 349 includes a bottom or inferior surface that functions as an interface plate 387 by which the deployment compartment 349 is coupled to a satellite body (not illustrated). The interior of the deployment compartment 349 may include at least one axial deployer 394 to extend axial support structures 318 and/or at least one radial deployer 393 to extend radial support structures 319. In implementations, the deployers 393 and 394 may control the extension of one or more than one support structure 318 and/or 319. The interior of the deployment compartment 349 may further include deployment control circuitry 395 (e.g., a controller) to control the deployment of the deployable antenna 316. The interior of the deployment compartment 349 may further include a hybrid coupler 376 used to manipulate the orthogonal LPDA signals from the flexible membranes of the deployable antenna 316 to form a single-phase center aperture, which can emit circularly polarized radiation patterns with a low axial ratio. In the illustrated implementation, the radial support structures 319 are coupled at radially distal portions to radially distal portions of the furled deployable antenna 316 via connecting elements 392. In the illustrated implementation, the axial support structures 318 are coupled to axially distal portions of the deployable antenna 316 via a distal plate 321. In the illustrated implementation, the distal plate 321 is shaped like a figure eight and the axial support structures 318 are coupled to the distal plate 321 at radially distal positions of the distal plate 321 axisymmetrically about a central axis of the deployable antenna system 300. Implementations are contemplated in which the distal plate 321 is shaped differently.

Figure 4:
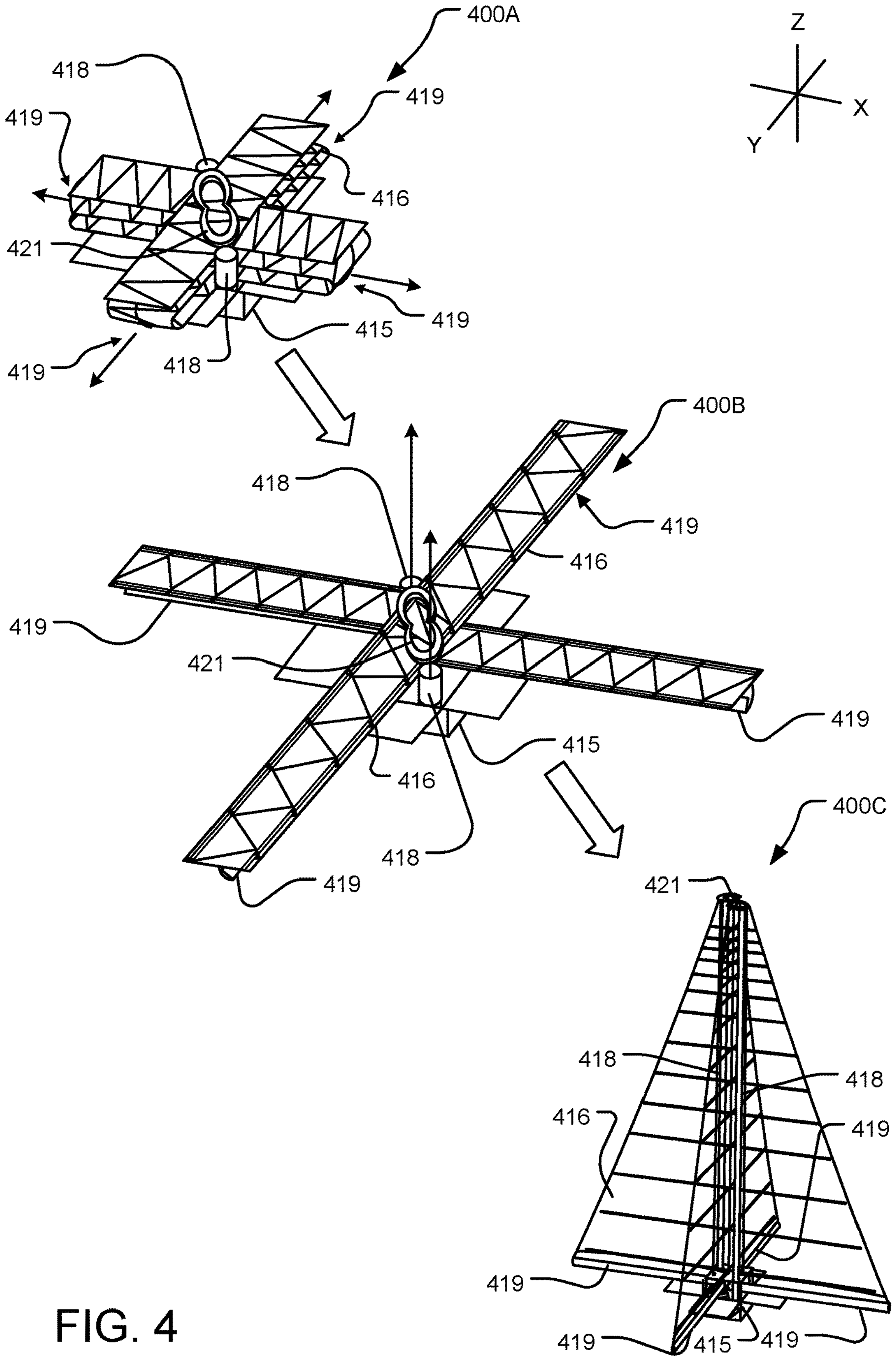
FIG. 4 illustrates an implementation of a deployable antenna unfurling progression.

FIG. 4 illustrates an implementation of stages 400A-C of a deployable antenna unfurling progression. A first stage 400A illustrates a furled deployable antenna 416. In the first stage 400A, the deployable antenna system extends radial support structures 419 radially outward relative to a central axis, thereby extending portions of the deployable antenna 416 coupled to the radial support structures 419 radially outward. The illustrated implementation presumes that the furled deployable antenna 416 has been furled to reduce the radial footprint of the deployable antenna 416 when stowed and/or undeployed. In implementations in which the deployable antenna has not been furled to reduce the radial footprint, the first stage 400A may be omitted.

A second stage 400B illustrates the deployable antenna 416 that has been furled to reduce the axial or z-dimension length of the stowed or furled deployable antenna 416. The deployable antenna system may extend the axial support structures 418 distally in an axial or z-direction from a deployment base. The axial support structures 418 may be coupled to the deployable antenna 416 via a distal plate 421.

A third stage 400C illustrates the deployable antenna 416 in an unfurled and/or deployed state. In the third stage 400C, the axial support structures 418 and radial support structures 419 (if applicable) have been extended to a predefined distance. The flexible membranes of the deployable antenna 416 have been completely unfurled, and the deployable antenna 416 is ready to transmit and/or receive signals.

Figure 5:
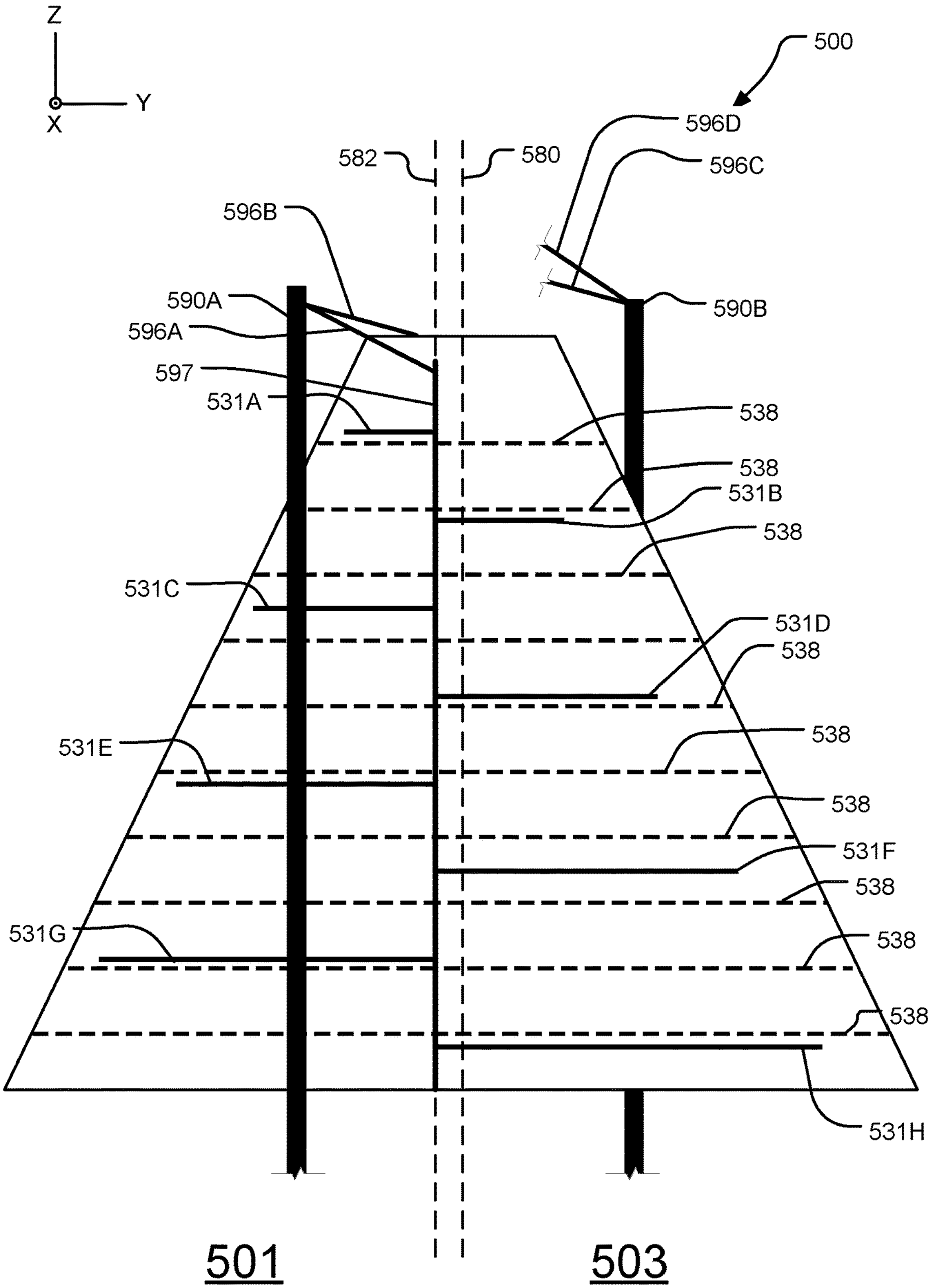
FIG. 5 illustrates an implementation of a sub-membrane of a flexible membrane in an unfurled state.

FIG. 5 illustrates an implementation of a first sub-membrane 500 of a flexible membrane in an unfurled state. The illustrated first sub-membrane 500 may be a sub-membrane of a dominant flexible membrane that is adapted to have portions with furls that furl about furls of a subordinate flexible membrane (e.g., flexible membrane having a first sub-membrane 600 illustrated in FIG. 6) with horizontal furling discontinuities 538 (e.g., creases, folds, or wrinkles). The horizontal furling discontinuities 538 may be at predefined positions (e.g., based on a predefined furling pattern of the first sub-membrane 500) that are staggered relative to the antenna elements 531A-H. This may reduce stress on the antenna elements 531A-H caused by furling. In implementations, the horizontal furling discontinuities 538 are located at predefined z-dimensional positions that are uniformly distributed in the z-dimension. In these implementations, if the spacing between the antenna elements 531A-H is non-uniform, one or more portions of the first sub-membrane 500 between the horizontal furling discontinuities 538 may include more than one of the one or more antenna elements 531A-H.

In implementations in which the deployable antenna 516 is furled to reduce the radial or x-y plane footprint, the first sub-membrane 500 may further include substantially vertical furling discontinuities that are substantially parallel with the z-axis when the first sub-membrane 500 is unfurled. These vertical furling discontinuities may intersect or otherwise overlap with one or more of the antenna elements 531A-H potentially causing stress. In implementations, furl resilience elements (not illustrated) may be introduced at the intersections or overlaps to mitigate stress caused by the vertical furling discontinuities. Implementations are also contemplated in which one or more horizontal furling discontinuities 538 intersect or overlap with one or more of the antenna elements 531A-H, and, similarly, furl resilience elements may be introduced at the intersections or overlaps to mitigate stress.

The first sub-membrane 500 includes an alternating antenna element coupling arrangement. For purposes of demonstration, the first sub-membrane 500 is illustrated with a central membrane axis 580 and a central antenna axis 582. Implementations are contemplated in which the axes 580 and 582 are coincident (not illustrated) or are not coincident as illustrated. In implementations, the first sub-membrane 500 is one of two or more sub-membranes that form a flexible membrane. For example, the flexible membrane may include a second sub-membrane. The second sub-membrane may include antenna elements arranged with mirror symmetry relative to the antenna elements 531A-H of the first sub-membrane 500 about the central membrane axis 580.

The first sub-membrane 500 and second sub-membrane may be coupled but separated by a predefined minimum distance at a predefined position of the first sub-membrane 500. The predefined minimum distance may remain the same or differ at different radial and/or axial positions of the first sub-membrane 500. The first sub-membrane 500 and the second sub-membrane may be arranged to have common projections in the illustrated y-z plane such that they appear substantially coincident when viewed from a position orthogonal to the illustrated y-z plane. In implementations, the first sub-membrane 500 and the second sub-membrane are substantially parallel to one another. In other implementations, the distance between the first sub-membrane 500 and the second sub-membrane differs in axial and/or radial directions.

The first sub-membrane 500 may include a central conductive coupler 597 that couples the antenna elements 531A-H to a first EMR circuitry coupler 590A. In the illustrated implementation, the central conductive coupler 597 is arranged as a center line of the antenna elements 531A-H along the central antenna axis. The first EMR circuitry coupler 590A coupled with the central conductive coupler 597 distally of the antenna elements 531A-H via a first electrical element 596A to form a top-fed antenna that functions as an LPDA antenna.

The first EMR circuitry coupler 590A may also include a second electrical element 596B. The second electrical element 596B may be electrically coupled to a second central conductive coupler of the second sub-membrane (not illustrated) of the flexible membrane that includes the first sub-membrane 500. The first electrical element 596A may be electrically coupled to a first conductive portion of the first EMR circuitry coupler 590A that is electrically insulated and/or isolated from a second conductive portion of the first EMR circuitry coupler 590A electrically coupled to the second electrical element 596B.

The first sub-membrane 500 is illustrated for the purposes of demonstration as divided into a first side 501 and a second side 503 about the central antenna axis 582. The antenna elements 531A-H are alternatively arranged about the central antenna axis on the first side 501 and the second side 503 along the illustrated z-axis to form an alternating antenna element configuration. It should be appreciated that, in implementations in which a second sub-membrane of the flexible membrane that includes the first sub-membrane 500 has mirror symmetry of antenna elements about the central membrane axis 580 relative to the first sub-membrane 500, if the distal-most antenna element 531A of the first sub-membrane 500 is on the first side 501 of the central antenna axis 582 of the first sub-membrane 500 (as illustrated), then a distal-most antenna element of the second sub-membrane would be arranged on a second side of a central antenna axis of the second sub-membrane (not illustrated).

Figure 6:
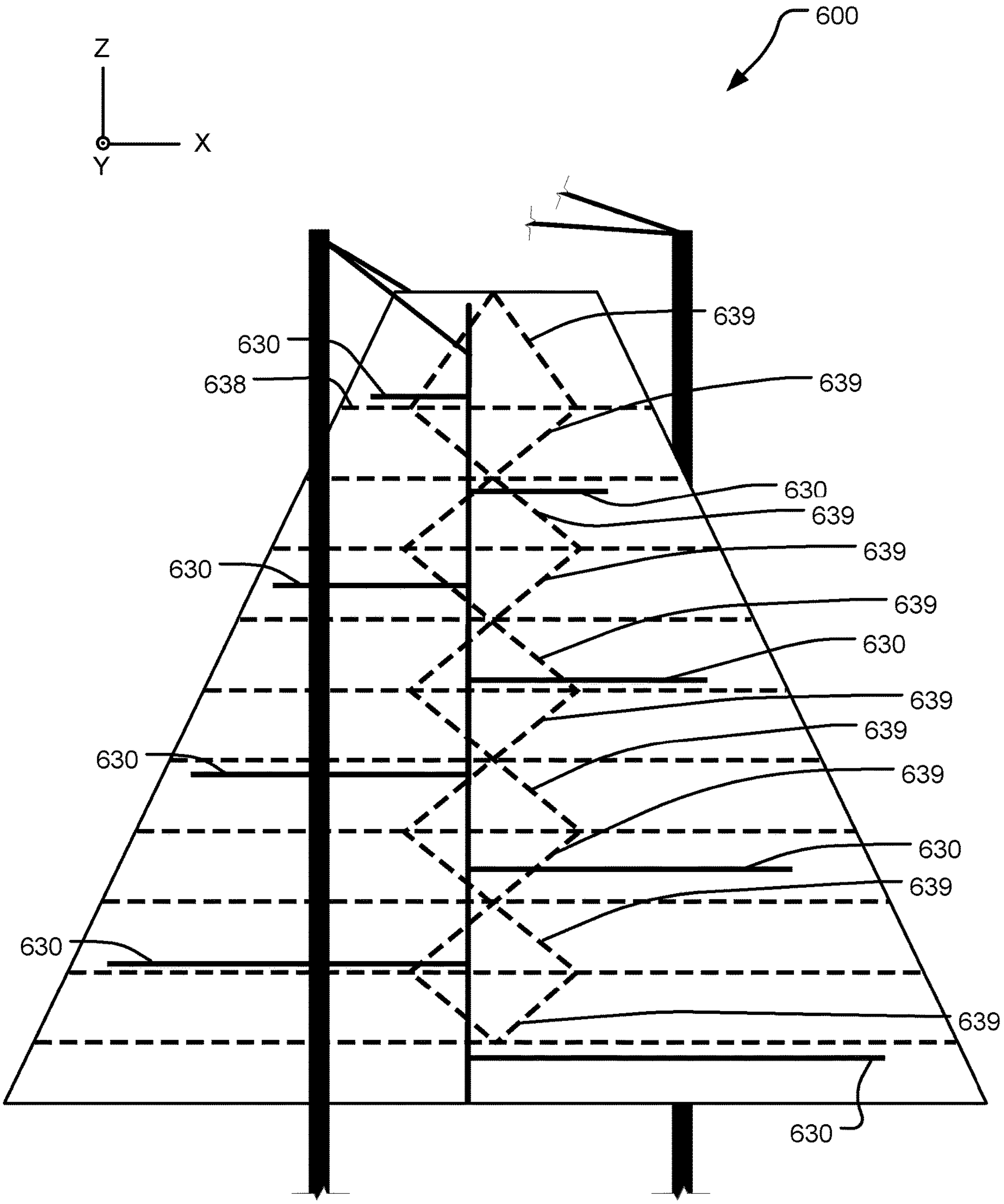
FIG. 6 illustrates another implementation of a sub-membrane of a flexible membrane in an unfurled state.

FIG. 6 illustrates another implementation of a first sub-membrane 600 of a flexible membrane in an unfurled state. The illustrated first sub-membrane 600 may be an element of a subordinate flexible membrane that is adapted to have portions furled within furls of a dominant flexible membrane (e.g., flexible membrane including the first sub-membrane 500). The flexible subordinate first sub-membrane 600 may be substantially the same as the dominant first sub-membrane 500, except that the first sub-membrane 600 may have different (e.g., more and/or differently configured) furls that allow portions of the first sub-membrane 600 to furl within the dominant first sub-membrane 500 when the flexible membrane including the subordinate first sub-membrane 600 and the flexible membrane including the dominant first sub-membrane 500 are furled, stowed, and/or undeployed.

In implementations, to facilitate this extra furling, diagonal furling discontinuities 639 are introduced to the first sub-membrane 600 in addition to the horizontal furling discontinuities 638. Because the diagonal furling discontinuities 639 have a vertical dimension, the diagonal furling discontinuities likely intersect or otherwise overlap with the antenna elements 630. As indicated, the intersection or overlap may cause stress to the antenna elements 630. As such, furl resilience elements can be introduced to the intersecting or overlapping portions of the antenna elements 630.

As in the first sub-membrane 500, in implementations in which the deployable antenna is furled to reduce the radial or x-y plane footprint, the first sub-membrane 600 may further include substantially vertical furling discontinuities (not illustrated) that are substantially parallel with the z-axis when the first sub-membrane 600 is unfurled. These vertical furling discontinuities may intersect or otherwise overlap with one or more of the antenna elements 630 and cause stress thereto. In implementations, furl resilience elements may be introduced at the intersections or overlaps to mitigate stress caused by the vertical furling discontinuities. Implementations are also contemplated in which one or more horizontal furling discontinuities 638 intersect or overlap with one or more of the antenna elements 630, and, similarly, furl resilience elements may be introduced at the intersections or overlaps to mitigate stress.

In implementations, a dominant flexible membrane (e.g., one including the first sub-membrane 500) and a subordinate flexible membrane (e.g., one including the first sub-membrane 600) may be coupled and intersect at a central axis of the deployable antenna. Implementations are also contemplated in which each of the dominant and subordinate flexible include two or more sub-membranes separated by a space of a predefined dimension (e.g., width or distance between the membranes). The space may be unoccupied by elements of the deployable antenna system at least in some portions. Implementations are contemplated in which rigid elements may occupy at least some of the space. The predefined distance may be sufficiently small as to not meaningfully impact the furling arrangements described herein. Alternative implementations are contemplated in which the flexible membranes could include only the one or the other of dominant flexible membranes (e.g., flexible membranes including the first sub-membrane 500) and subordinate flexible membranes (e.g., flexible membranes including the first sub-membrane 600).

Figure 7:
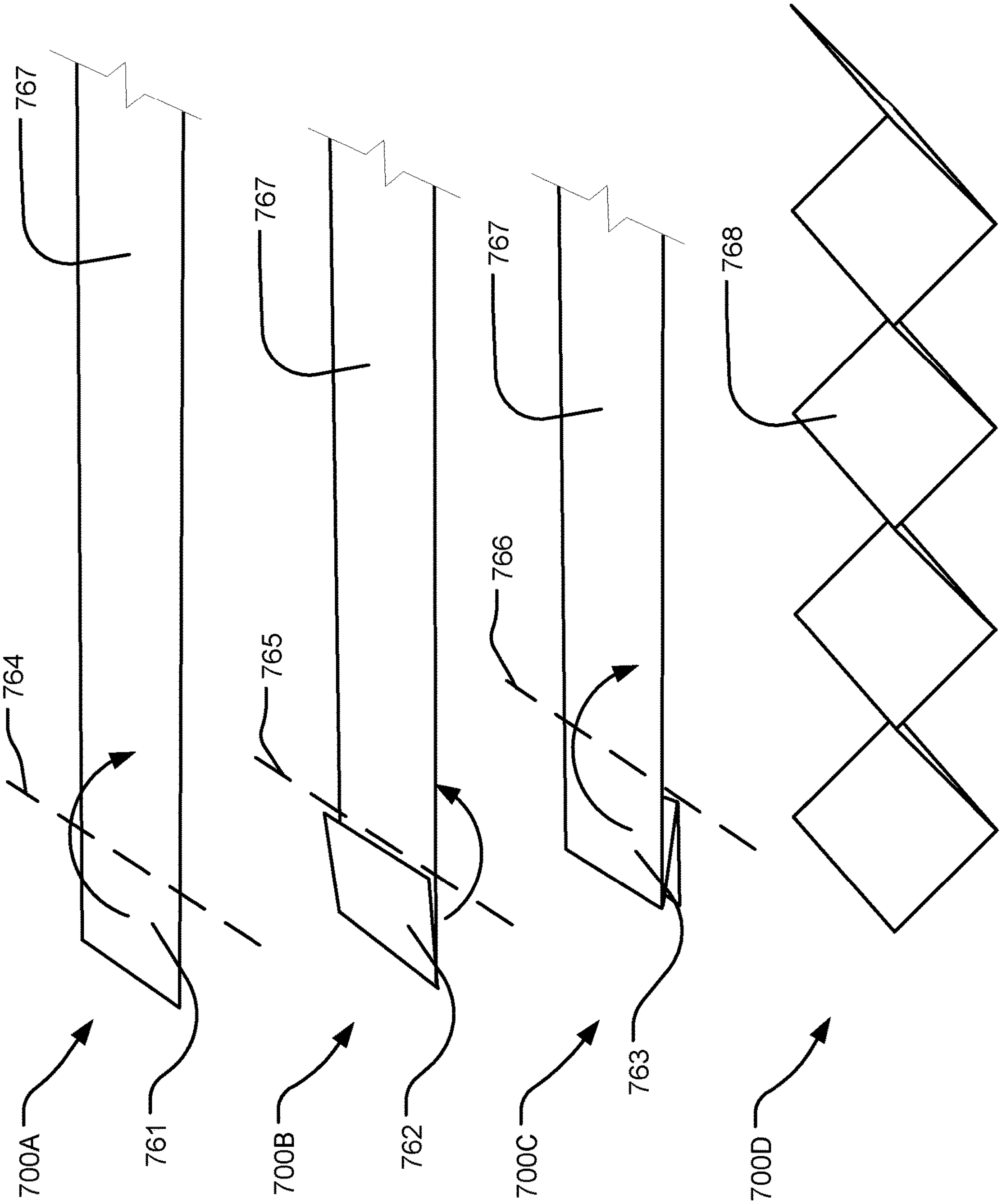
FIG. 7 illustrates an implementation of a furling arrangement to reduce a stowed axial or radial footprint.

FIG. 7 illustrates an implementation of furling progression stages 700A-D to reduce a stowed axial or radial footprint. The furling arrangement is illustrated as a z-fold furling. The flexible element to be folded is illustrated as a flexible strip, but this folding procedure may be applied to any flexible element including the flexible membranes of the deployable antenna described herein (e.g., to reduce the axial or z-dimension height of the deployable antenna or to reduce a radial or x-y plane footprint after the axial or z-dimension height of the deployable antenna is already reduced with a furl). The z-fold furling involves folding the first portion to be folded or the portions already folded alternatively over and under an unfolded portion 767. In a first stage 700A, a distal portion 761 of the flexible strip is folded around a first axis 764 over an unfolded portion 767. In a second stage 700B, a folded portion 762 is folded around a second axis 765 (e.g., an axis more proximal to the unfolded portion 767) under the unfolded portion 767. In a third stage 700C, a further folded portion 763 is folded around a third axis 766 over the unfolded portion 767. This procedure of alternatively folding over and under the unfolded part may be continued until a predefined furling is reached. Stage 700D shows the strip completely z-folded along its entire length.

Although illustrated as a thin strip, it should be appreciated that the element to be z-folded may be multilayered. For example, implementations are contemplated in which a deployable antenna has flexible membranes with more than one sub-membrane with a space of a predefined dimension therebetween. Also, z-folding may be conducted first to reduce the axial or z-dimensional height, and then z-folding can be further applied to the already z-folded membranes to reduce a radial or x-y plane footprint.

Further, implementations are contemplated in which the flexible membranes are coupled to or include rigid or semi-rigid portions. In some implementations, the flexible membranes are composed of rigid or semi-rigid portions that are coupled to one another with flexible portions. In some implementations, the flexible membranes may include sub-membranes that couple the rigid or semi-rigid portions therebetween. In other implementations, rigid elements are coupled to exterior surfaces of the flexible membranes and/or the sub-membranes of the flexible membranes. In the implementations in which the flexible membranes include and/or are coupled to rigid or semi-rigid portions, the folds of the z-folds may be conducted between the rigid or semi-rigid portions on a continuous membrane and/or in flexures between the rigid or semi-rigid portions. In implementations, horizontal furling discontinuities may result from z-folds.

FIG. 8 illustrates another furling configuration 800 to reduce a stowed radial footprint. The furling configuration 800 is demonstrated with an image of a single side 860 of a flexible membrane relative to a central axis of the flexible membrane after the flexible membrane has been furled to reduce the axial or z-dimensional height (e.g., by z-folding). Although illustrated as a single layer for purposes of simplicity, it should be understood that the single layer represents the layers in the axial z-direction of the furled flexible membrane to reduce the axial or z-dimensional height (e.g., using a z-fold).

The illustrated furling configuration 800 is a rolled or yin-yang configuration furl. In an implementation, to generate the furling configuration 800, small-radius loops 863 and 864 are formed as initial bends at or near the middle of the z-folded single side 860 of the flexible membrane. After the initial bends (which result in the small-radius loops 863 and 864), the remaining length of the z-folded flexible membrane is rolled around the small-radius loops 863 and 864.

Figure 9:
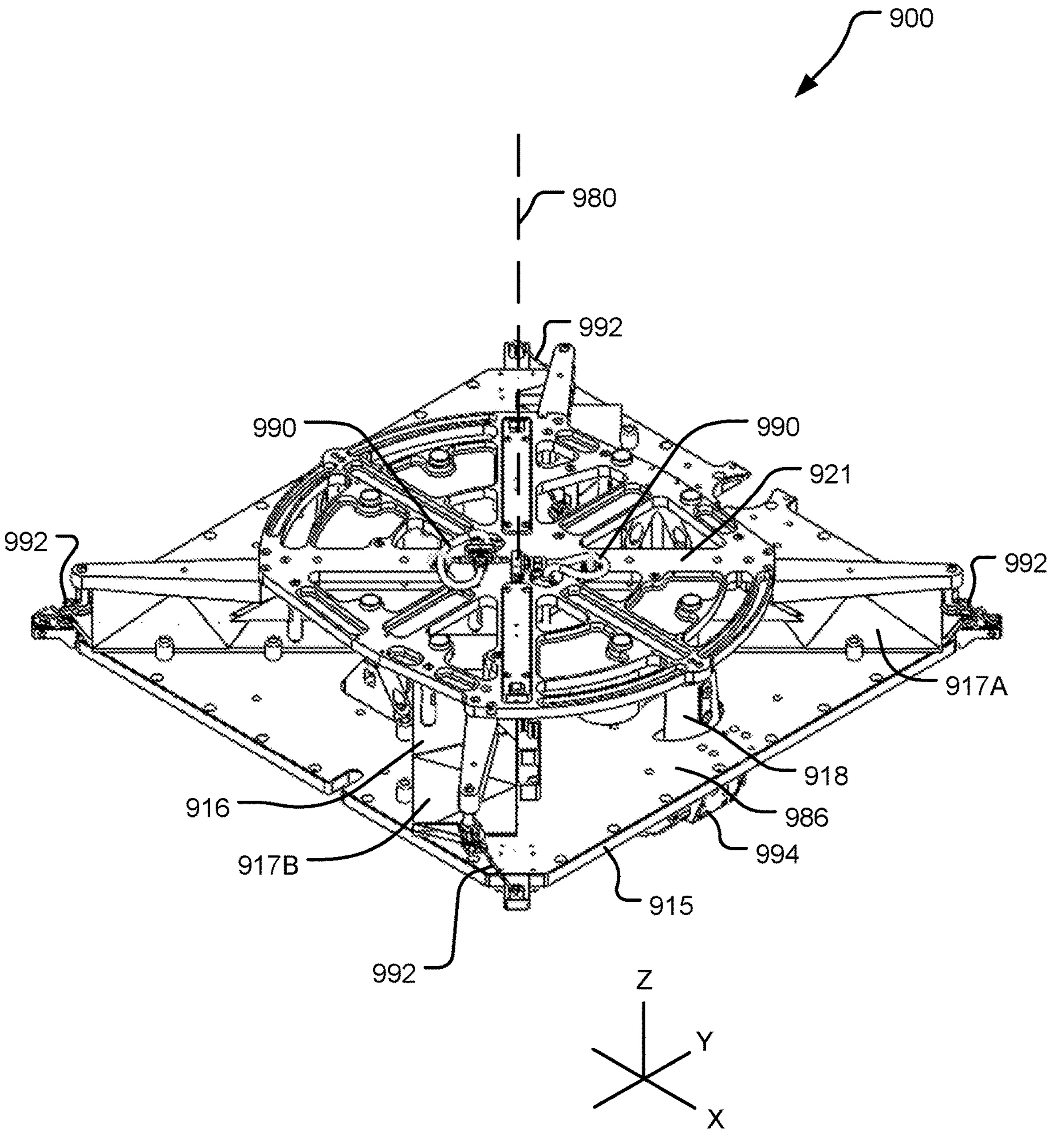
FIG. 9 illustrates an implementation of a deployable antenna system in an undeployed state.
Figure 10:
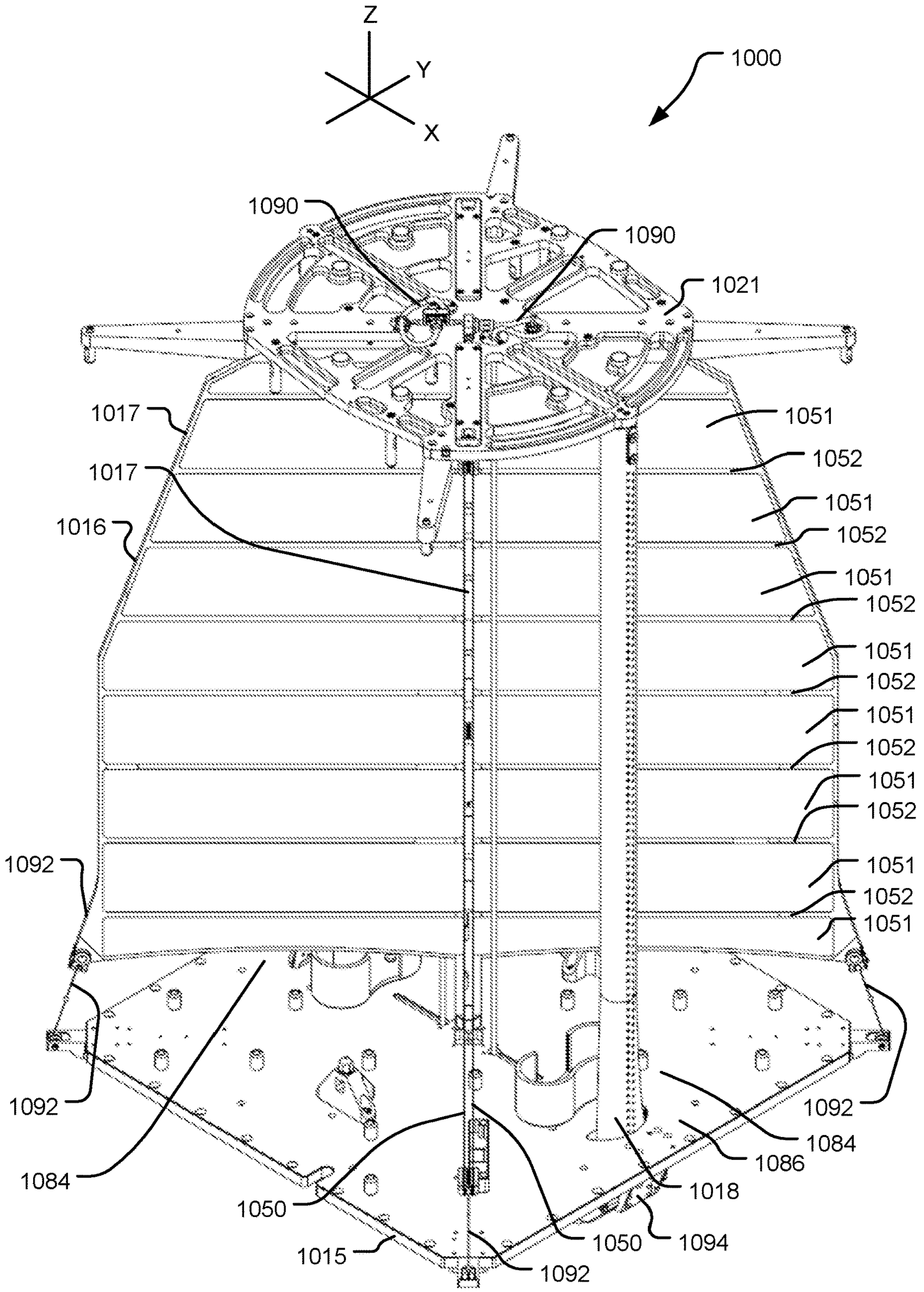
FIG. 10 illustrates an implementation of a deployable antenna system in a deployed state.
Figure 11:
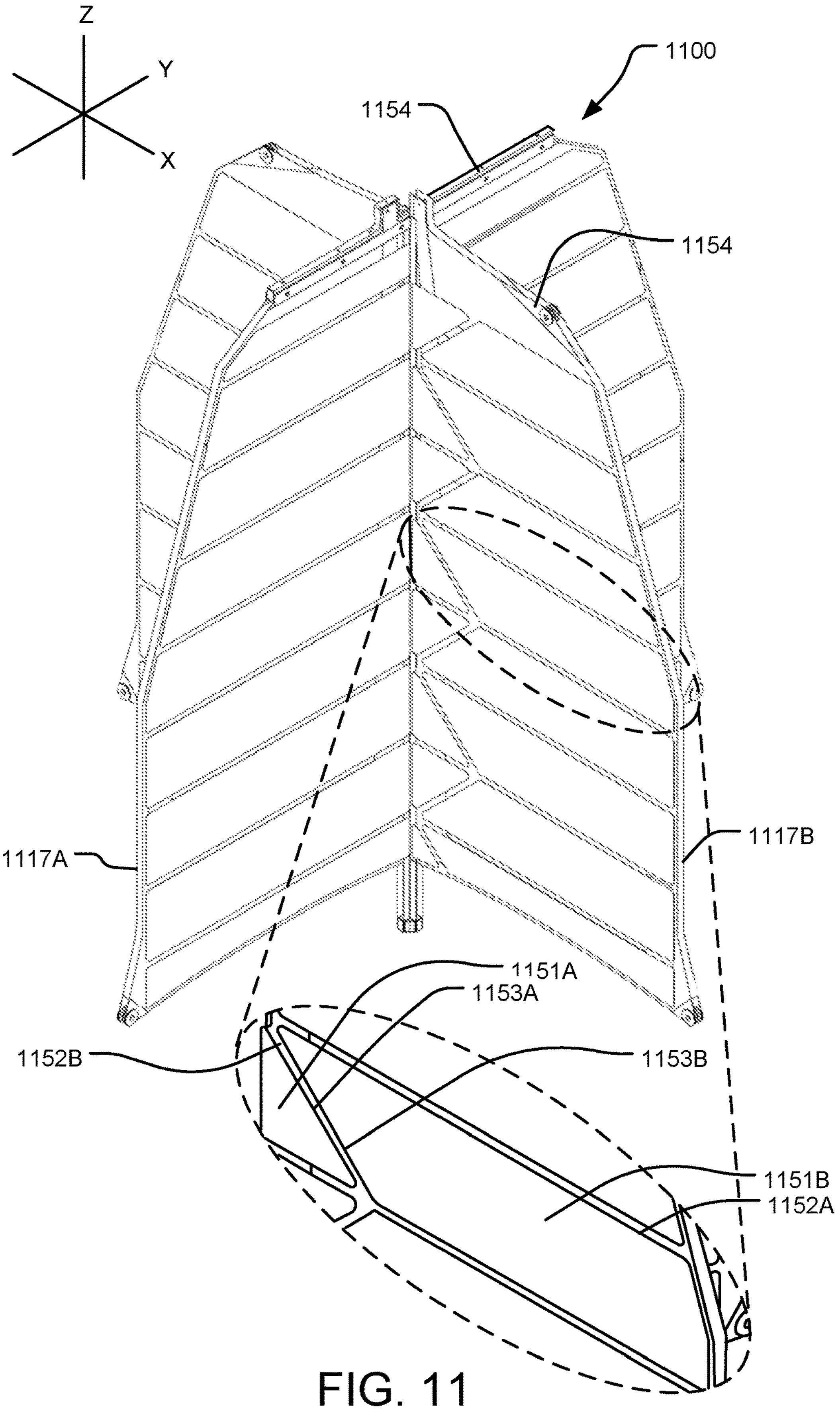
FIG. 11 illustrates an implementation of a deployable satellite system in a deployed state.

FIGS. 9-11 illustrate implementations of the deployable antenna in which the radial or x-y dimensional footprint of a deployable antenna is sufficiently small to fit in a launch canister. As such, there are no elements to furl or unfurl the deployable antenna in the radial or x-y reference plane. In this implementation, radially distal portions of the flexible membranes are coupled to connecting elements (e.g., connection elements such as tensioned lanyards or cables).

FIG. 9 illustrates an implementation of a deployable antenna system 900 in an undeployed state. The illustrated deployable antenna system includes a dominant flexible membrane 917A and a subordinate flexible membrane 917B. As illustrated, the flexible membranes 917A and 917B are furled by z-folding to form a staggered furl configuration. As illustrated, the dominant flexible membrane 917A is arranged in a substantially straight line through a central axis 980. The subordinate flexible membrane 917B is staggered about the central axis 980.

The deployable antenna system 900 includes a distal plate 921 coupled to an axially distal portion of an axial support structure 918. An axially proximal portion of the axial support structure 918 is coupled to and/or deployed from a deployer 994 (e.g., a tape dispenser). In the furled state, the axial support structure 918 has yet to extend away from the deployment base 986 of a deployment compartment. The deployable antenna system 900 further includes EMR circuitry couplers 990 to couple the antenna elements in the deployable antenna 916 with EMR control circuitry (not illustrated) in the deployment compartment of a satellite body.

FIG. 10 illustrates an implementation of a deployable antenna system 1000 in a deployed state. To deploy the deployable antenna 1016 to the deployed state, a deployer 1094 has extended axial support structures 1018 axially from a deployment base 1086. The extension of the axial support structures 1018 extends a distal plate 1021 coupled to axially distal portions of the axial support structures 1018. EMR circuitry couplers 1090 are coupled to the distal plate 1021 and are correspondingly axially displaced. In the illustrated implementation, corners 1084 are cater-cornered and each deploys one of the axial support structures 1018 and one of the EMR circuitry couplers 1090.

One or more of the distal plates 1021 and the axial support structures 1018 are coupled to one or more axially distal portions of the flexible membranes 1017. When the axial support structures 1018 are extended axially, the flexible membranes 1017 unfurl to an unfurled, deployed configuration.

In the illustrated implementation, each flexible membrane 1117 has two sub-membranes 1050 with a space of a predefined dimension therebetween. In this implementation, the flexible membranes 1117 include rigid portions 1051 coupled to one another by flexible portions 1052. In this implementation, each sub-membrane 1050 of a flexible membrane 1017 is coupled to an exterior rigid element to form the rigid portions 1051. The flexible portions 1052 are defined by portions of the sub-membranes between which there are no rigid or semi-rigid elements. Alternative implementations are contemplated in which the rigid portions are placed in at least some of the space between sub-membranes. In these implementations, furling discontinuities, if any, will be at the flexible portions 1052. As such, furl resilience elements may be added to positions on the flexible portions 1052. In the illustrated implementation, the antenna elements (not illustrated) are integrated with (e.g., inlaid in or otherwise coupled to) the rigid portions.

FIG. 11 illustrates an implementation of a deployable satellite system 1100 in a deployed state. This implementation includes a dominant flexible membrane 1117A and a subordinate flexible membrane 1117B, each of which includes two coupled sub-membranes with a space of predefined dimension therebetween. In this implementation, each rigid portion of the subordinate flexible membrane 1117B includes a first rigid portion 1151A with a first diagonal edge 1153A and a second rigid portion 1151B with a second diagonal edge 1153B that compliments the first diagonal edge 1153A. The illustrated implementation also demonstrates connecting elements 1154 to connect the flexible membranes 1117A and 1117B to a distal plate (not illustrated). In this implementation, axial support structures (not illustrated) would be coupled to the flexible membranes 1117A and 1117B via a distal plate (not illustrated) coupled to the connecting elements 1154

Figure 12:
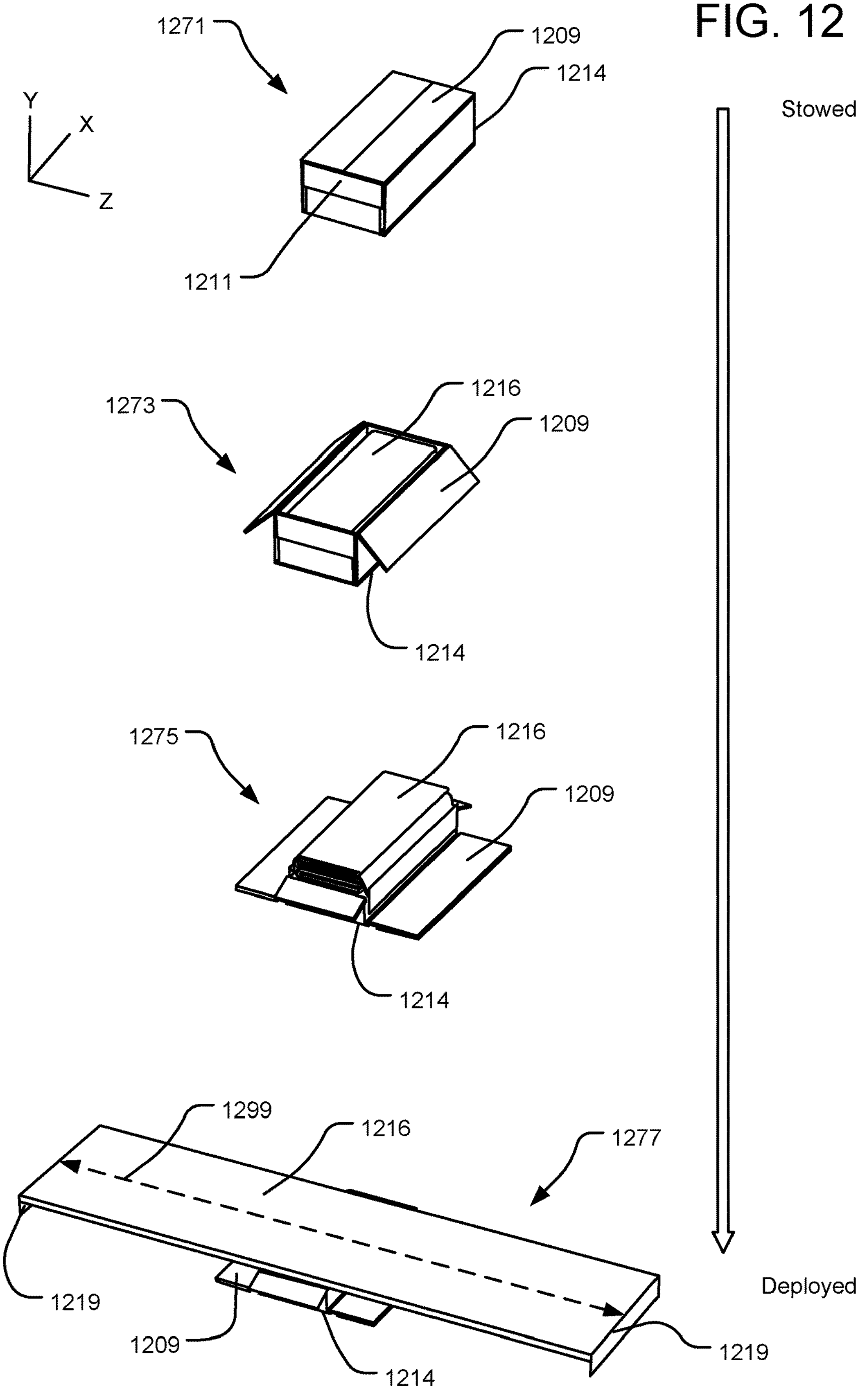
FIG. 12 illustrates an example deployment progression for deploying an implementation of a deployable antenna.

FIG. 12 illustrates an example deployment progression for deploying an implementation of a deployable antenna 1216. The deployable antenna 1216 may include antenna elements that form one or more of an LPDA antenna, a phased array antenna, a reflectarray antenna, another reflector antenna, another array antenna, and the like.

At a first stage 1271, the deployable antenna is stowed in a launch canister 1214 (e.g., a launch canister 1214 that may also serve as a deployment compartment). At a second stage 1273, a door and lid assembly 1209 of the launch canister 1214 begins to open partially exposing the deployable antenna 1216 in a furled state. At a third stage 1275, another portion of the door and lid assembly 1209 opens to further expose the deployable antenna 1216 in the furled state to allow the deployable antenna 116 to unfurl. At stage 1277, axial support structures (not illustrated) have extended in at least one axial direction 1299 (e.g., in a z-direction parallel to a z-axis as illustrated) to unfurl the deployable antenna 1216.

In the illustrated implementation, flexible membranes of deployable antenna 1216 are extended axially in opposing axial directions 1299, but implementations are contemplated in which the membranes of the deployable antenna 1216 extend in only one axial direction. In the illustrated implementation, the deployable antenna 1216 includes axially terminal standoffs 1219 to which extendable axial support structures may be coupled to axially extend portions of the deployable antenna 1216 in one or more axial directions.

In implementations, the launch canister 1214 includes an interface plate (not illustrated) on an inferior side of the launch canister 1214 (not visible from the perspective of FIG. 12). In implementations, the axial direction may be parallel to and/or offset from a plane defined by a surface of the interface plate. Although not illustrated, implementations are contemplated in which the deployable antenna 1216 is configured to be extended and/or unfurled radially (e.g., in an x-direction parallel to the x-axis) using extendable axial support structures.

Figure 13:
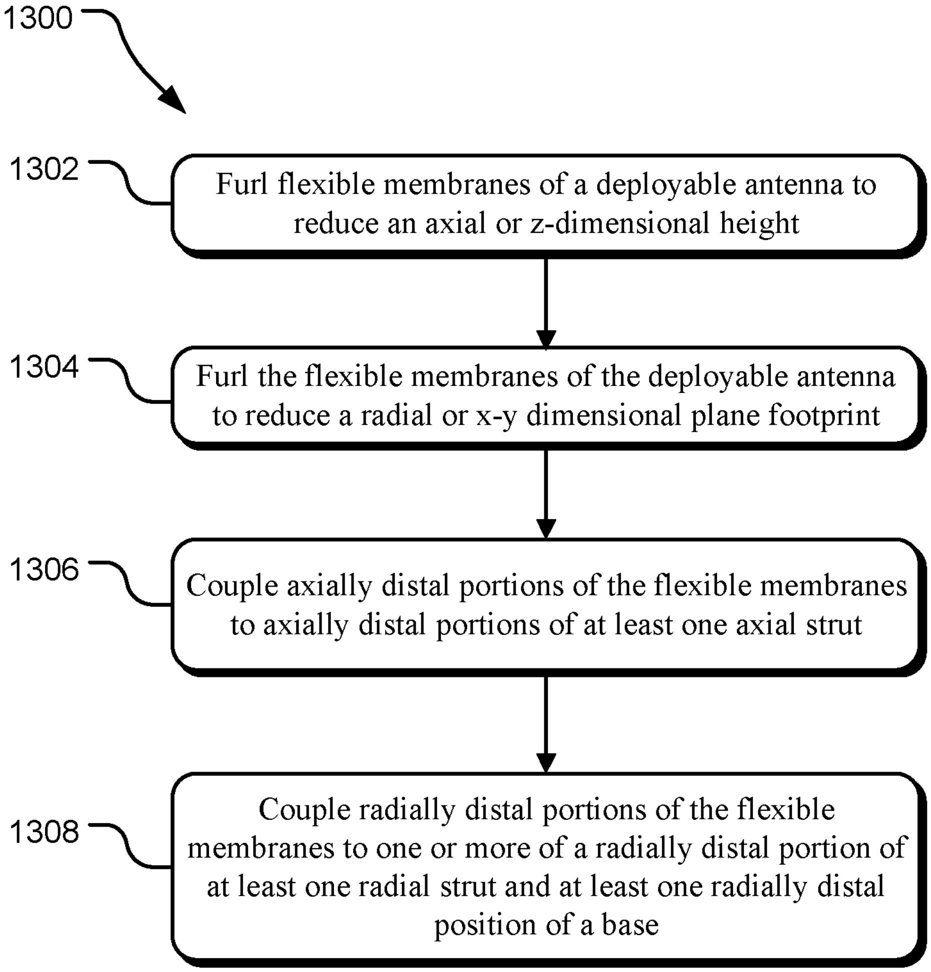
FIG. 13 illustrates an implementation of operations for installing a deployable antenna system to be stowed in a launch canister.

FIG. 13 illustrates an implementation of operations 1300 for installing a deployable antenna system to be stowed in a launch canister. Axial furling operation 1302 furls flexible membranes of a deployable antenna to reduce an axial or z-dimensional height. The flexible membranes may include a dominant flexible membrane that is furled with a z-folded configuration furling (e.g., as demonstrated in FIG. 7) and a subordinate flexible membrane with an interleaving furl that interleaves portions of the subordinate flexible membrane between furls (e.g., folds) of the dominant flexible membrane.

In implementations, to place the deployable antenna in a furled or undeployed state, the deployable antenna is first furled to reduce the axial or z-dimension height. The first axial or z-dimension furling may include a z-fold. A z-fold is a folding pattern that alternates between folding up and under (see e.g., FIG. 7 for a description of z-folding) the still unfurled portion of the flexible membrane to be furled. In implementations, this first furl may form a flattened cruciform configuration or a staggered furl configuration of the deployable antenna.

The staggered furl configuration may arrange the flexible membranes such that, in implementations with two flexible membranes that intersect at a central axis (e.g., to have a cruciform configuration when unfurled), a subordinate flexible membrane is interleaved with a dominant flexible membrane such that the interleaving includes more material from the subordinate flexible membrane than from the dominant flexible membrane. For example, the subordinate flexible membrane includes portions furled both radially and axially within axial furls of a dominant flexible membrane using diagonal furls in the subordinate flexible membrane. After the first axial furl, both sides of a dominant membrane of the flexible membranes relative to the center are aligned substantially linearly, but the sides of a subordinate membrane of the flexible membranes are staggered.

The staggering may be axisymmetric relative to a central axis of the deployable antenna. The staggering may maintain the physical coupling between the flexible membranes at the intersection of the flexible membranes when in a furled state. In implementations, when furled, each furl (e.g., fold, crease, wrap, bend, or wrinkle) of the dominant membrane contains an extra layer of material of the subordinate membrane when in the furled state. In other implementations, when furled, alternating furls or furls at other intervals of the dominant membrane contain more than two material layers of the subordinate membrane when in the furled state. To facilitate the furls of the subordinate flexible membrane, diagonal furls in the subordinate flexible membrane may be used (see e.g., diagonal furling discontinuities 639 in FIG. 6). After the first z-folding is conducted to form the staggered furl configuration, the radial longitudinal length of the subordinate membrane may be less than the radial longitudinal length of the dominant membrane (because radial portions of the subordinate membrane are doubly layers within single layer z-folds of the dominant membrane).

Radial furling operation 1304 furls the flexible membranes of the deployable antenna to reduce a radial or x-y dimensional plane footprint. The radial furling may be accomplished by a z-fold configuration furling and/or by a rolled configuration furling (e.g., as demonstrated in FIG. 8).

In implementations in which the radial or x-y dimensional footprint (e.g., cross-sectional area) of the deployed deployable antenna 116 is too large to stow in the canister, a second furl may subsequently be performed. The second furl may include one or more of a z-fold furling configuration and/or a rolled (e.g., a yin-yang configuration) furling configuration as described herein to reduce the radial or x-y dimensional footprint. This second furl may further stack elements in the axial or z-dimension that already have been furled in the first furl. The stacking may increase the axial or z-dimension height of the deployable antenna relative to the first furl in the undeployed or stowed state.

In implementations in which the first axial furl from the axial furling operation 1302 forms a staggered furl configuration, the subordinate membrane may be furled less in a second radial furl to reduce the radial footprint than the dominant membrane (e.g., because the dominant membrane extends radially further than the subordinate membrane in the staggered furl configuration). In the staggered furl configuration, the dominant and subordinate membranes may have the same or different longitudinal radial lengths after the second furl. In implementations in which the deployable antenna fits into a launch canister without any reduction of the radial or x-y dimension plane footprint, radial furling operation 1304 may be omitted.

Axial coupling operation 1306 couples axially distal portions of the flexible membranes to axially distal portions of at least one axial support structure. The coupling may be direct or via one or more of connecting elements and a distal plate.

Radial coupling operation 1308 couples radially distal portions of the flexible membranes to one or more of a radially distal portion of at least one radial support structure and at least one radially distal position of a deployment base (e.g., via connecting elements). In implementations in which the deployable antenna fits into a launch canister without any reduction of the radial or x-y dimension plane footprint, the flexible membranes may be coupled to the one or more radially distal positions on the deployment base. In implementations in which the deployable antenna does not fit into a launch canister without any reduction of the radial or x-y dimension plane footprint, the flexible membranes may be coupled to the one or more radially distal portions of the one or more radial support structure.

Figure 14:
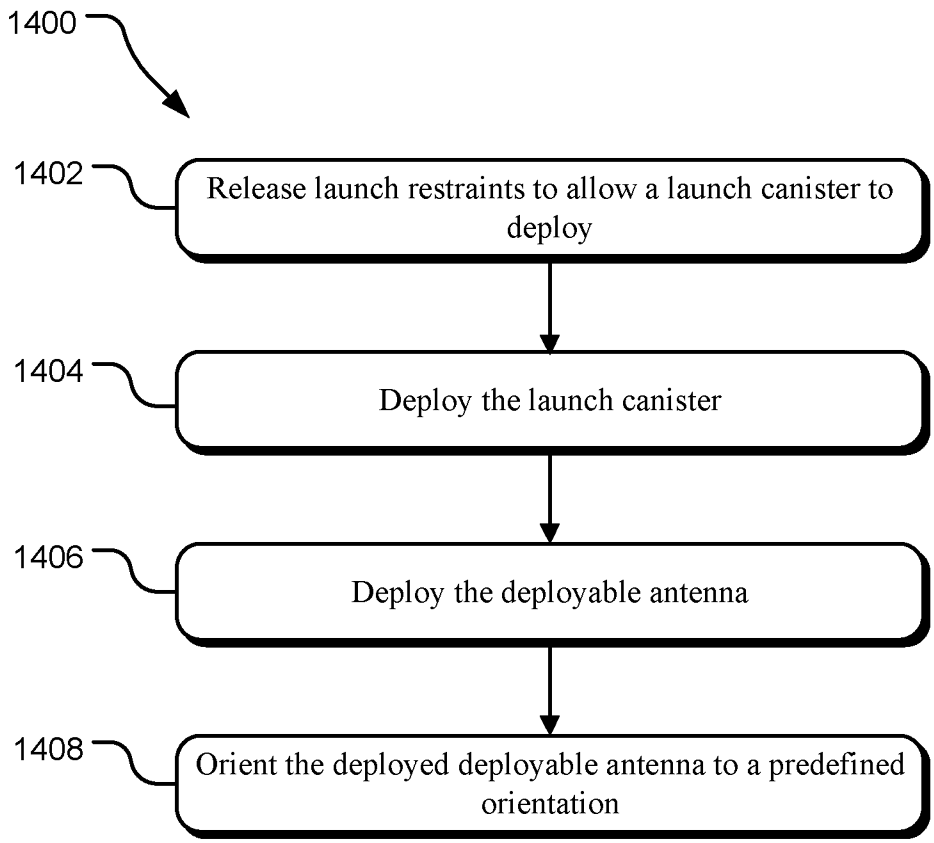
FIG. 14 illustrates an implementation of operations for deploying a deployable antenna system in an extraterrestrial environment.

FIG. 14 illustrates an implementation of operations 1400 for deploying a deployable antenna system in an extraterrestrial environment. A releasing operation 1402 releases launch restraints to allow a launch canister to deploy. Implementations are contemplated in which the launch canister does not include launch restraints, and releasing operation 1402 may be omitted. The releasing operation may occur after launch in the extraterrestrial environment (e.g., in phase 109 illustrated in FIG. 1).

A canister deployment operation 1404 deploys the launch canister. The launch canister may be deployed by opening one or more of a lid and doors of the launch canister. In implementations, a deployment compartment is integral to the launch canister. In various implementations, the lid and doors may remain integral with the deployment compartment after the canister deployment operation 1404.

An antenna deployment operation 1406 deploys the deployable antenna. The antenna deployment operation 1406 extends one or more of radial and axial support structures distally from the deployment compartment to cause flexible membranes of the deployable antenna to unfurl. In implementations, the antenna deployment operation 1406 may begin contemporaneously with the canister deployment operation 1404. An implementation of deployable antenna deployment operations is presented in operations 1400 of FIG. 14.

An orienting operation 1408 orients the deployed deployable antenna to a predefined orientation. The orientation may be towards an object with which the deployable antenna is configured to exchange EMR signals.

Figure 15:
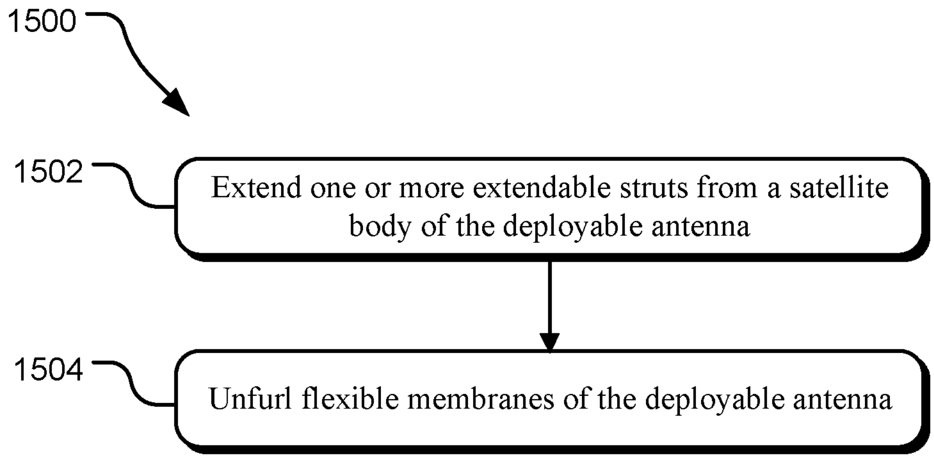
FIG. 15 illustrates an implementation of antenna deployment operations for deploying a deployable antenna.

FIG. 15 illustrates an implementation of antenna deployment operations 1500 for deploying a deployable antenna. An extending operation 1502 extends one or more extendable support structures from extendable support structure deployers. The extendable support structures may be one or more of axial support structures and radial support structures. In implementations, the extension of axial support structures occurs before or during an extension of radial support structures. For example, the radial support structures may be first fully extended before the axial support structures are extended at all or the radial support structures may begin extending before the axial support structures with some overlap in the time of extension. Implementations are also contemplated in which the radial and axial support structures begin extension contemporaneously. In implementations in which the radial or x-y dimension plane footprint is sufficiently large to accommodate the deployable antenna without radial furling, radial support structures and, hence, extension thereof, may be omitted. The extension of the support structures may cause or at least contribute to an unfurling operation 1502.

Terminal ends (e.g., ends as described herein such as radial or x-y dimension ends and/or terminal vertical or z ends) of the deployable antenna flexible membranes deploy away from the deployment compartment with the use of motorized and/or mechanical tape deployer assemblies, which are mechanically or electronically synchronized to work in concert deploying and tensioning the deployable antenna flexible membranes. The axial and/or radial support structures may deploy in compression to balance the tension loads of the membrane. In implementations, tensioned lanyards or cables are attached at one or more tape/membrane interfaces. In implementations, the membrane/tape interfaces further include a spring tensioning system to afford compliance of the structure while maintaining the desired membrane tension for electromagnetic radiation transmission and/or reception performance.

Each axial support structure may be deployed in synchronicity where each of the axial support structures is the same axial length such that when the deployable antenna is fully deployed, each axial support structure extends the same length from the deployment base at the same time. Each radial support structure may be deployed in synchronicity where each of the radial support structures is the same axial length such that when the deployable antenna is fully deployed, each radial support structure extends the same length from the deployment compartment at the same time. In this case, the deployed state of the deployable antenna may be symmetric about the deployable antenna system, with the mass of the deployable antenna and the deployable support structures being evenly distributed about the deployable antenna system. In other implementations, the deployment may be asymmetric, such as with different lengths of axial support structures and/or different lengths of radial support structures.

Support structures may be or include bi-stable tapes that can be unrolled to deploy and provide support for the deployable antenna. For example, deployers (e.g., tape dispensers, not illustrated) associated with each support structure may be included as part of the deployable antenna system. Upon deployment of the deployable antenna system, deployers may extend the support structures (e.g., composite tape struts) from a rolled to an unrolled state. In this example, the tapes may be carpenter-style tapes where the tapes extend (e.g., unroll from the deployers or dispensers) to expand the deployable antenna to its deployed state and provide structural rigidity to the deployed state of the deployable antenna.

In implementations, the satellite body includes solar panels and/or instrumentation, which may include one or more of a variety of instruments, including antenna circuitry. The antenna circuitry may communicate energy (e.g., provide or receive) with the deployable antenna to cause the deployable antenna to emit and/or receive radiofrequency (RF) waves, infrared (IR) frequency waves, ultraviolet (UV) frequency waves, x-ray frequency waves, visible light frequency waves, or other energy frequency waves. The instrumentation may be configured to provide energy to the deployable antenna to emit a beam of radiofrequency energy or other electromagnetic radiation. Such electromagnetic radiation or other electromagnetic radiation may be used to communicate signals between devices on a celestial body and the deployable antenna system 102. For example, the transmissions may be conducted one or more of at ultra-high frequency (UHF), in the S-Band, and in the L band frequencies. In implementations in which the deployable antenna is an LPDA, one or more of solar panels, circuit boards, electromagnetic radiation (EMR) control circuitry, rigid portions, or semi-rigid portions may be integral to or coupled to the flexible membranes (e.g., between antenna element portions). An LPDA relies on the antenna elements and their relative spacing rather than the electromagnetic properties of the flexible membranes themselves to transmit and receive signals. As used herein, in implementations with one or more of rigid portions and semirigid portions, rigid portions can be distinguished from semi-rigid portions in that rigid portions are substantially inelastic and semi-rigid portions are elastic but less flexible than the flexible material of thin membranes or flexures used to make the flexible members flexible between the semi-rigid portions.

EMR circuitry couplers (e.g., coaxial or other electronic cables) may be provided from the satellite body (e.g., in a spool) and/or the deployment compartment at one or more of the corners defined by the flexible membranes. The electrical cables may electrically couple antenna circuitry in the satellite body and/or deployment compartment with the antenna elements of the flexible membranes. In implementations, the EMR circuitry couplers are physically coupled (whether directly or via cables or lanyards) to one or more of an axially distal position of the flexible membranes, the distal plate, and axial support structures and are axially extended during deployment by extending the axial support structures axially in the extending operation 1502. In implementations with more than one EMR circuitry coupler, the EMR circuitry couplers may be arranged in the corners while maintaining substantial axisymmetry about the central axis of the deployable antenna. For example, in deployable antenna systems 102 with four corners (as illustrated) and two EMR circuitry couplers, the two EMR circuitry couplers may be arranged in corners opposite one another (e.g., cater-corner or diagonally opposite one another in a radial or x-y reference plane). In deployable antenna systems with four corners and four EMR circuitry couplers, each of the EMR circuitry couplers may be positioned in a different corner.

An unfurling operation 1504 unfurls flexible membranes of the deployable antenna. The extending operation 1502 may cause or at least contribute to the unfurling operation 1504. When deploying the deployable antenna, the flexible membranes of the deployable antenna may be unfurled in a particular order or may be unfurled over overlapping periods of time or may be unfurled concurrently.

In implementations, the flexible membranes are furled axially (e.g., in a vertical or z-direction) in the stowed state and are deployed by unfurling responsive to extending axial support structures axially (e.g., vertically in a z-direction) in the extending operation 1502. In implementations in which the deployable antenna includes axial support structures, the axial support structures may be coupled to axially distal (e.g., substantially axially terminal) positions of the flexible membranes (when unfurled) directly (e.g., using cables or lanyards) or via a distal plate.

In implementations, the unfurling operation 1504 includes radial unfurling in the radial or x-y plane by extending the radial support structures before or contemporaneously with axial unfurling in an axial or z-dimension direction. In implementations in which the radial footprint is sufficiently large to accommodate an entire radial cross-section of the undeployed deployable antenna, there may be no radial furl to unfurl, eliminating unfurling in the radial direction.

In implementations, as the axial and/or radial support structures extend in the extending operation 1502, the ends of support structures push and/or pull to unfurl the flexible membranes to transition the deployable antenna from its undeployed state to its deployed state. In the deployed state, the flexible membranes may be extended to a substantially planar and/or flat arrangement. As used herein, substantially planar or substantially flat may mean that points on all or a portion of the deployed flexible membranes diverge by less than a predefined distance in a plane (e.g., the plane defined by the peripheral edges of each of the flexible membranes) or a predefined angle relative to an edge (e.g., an edge among the peripheral edges of each of the flexible membranes).

In implementations, tension lanyards may be affixed to or near a peripheral region at the perimeter of the expanded form of the deployable antenna (e.g., the same points of attachment as the distal ends or portions of the support structures). In these implementations, when unfurling the deployable satellite, the tension lanyards can provide tension to pull the flexible membranes taut to a substantially planar arrangement (e.g., in a plane partially defined by the illustrated z-axis). These tensioning devices may include springs, pulleys, rollers, or other tensioning devices. These devices can be attached to the same locations near a periphery region at the perimeter of the expanded form of flexible membranes where the support structures are coupled (e.g., at a top plate or at a deployment base) and can provide tension to the tension lanyards and cause the expanded form of the flexible membranes to be pulled to a substantially flat arrangement.

Additional tensioning devices may also be connected to the proximal ends or portions of the support structures (e.g., the connection point of the support structures to the deployment base). These tensioning devices may also include springs, pullies, rollers, or other tensioning devices. These tensioning devices may also be connected to the proximal ends or portions of tension lanyards and may also provide tension to the tension lanyards and cause the expanded form of the deployable antenna to be pulled to a substantially flat, planar arrangement. In implementations, as illustrated, one or more of the substantially flat, planar surfaces of the flexible membranes may be substantially orthogonal to a surface of the deployment base. Consistently, one or more of the flexible membranes may include a planar surface that is substantially orthogonal to the x-y reference plane.

In implementations in which the deployable antenna is an LPDA antenna, the substantial flatness of the flexible membranes may be less crucial than in other systems, as the effectiveness of the deployed deployable antenna is based on the spacing between antenna elements rather than the nature of the surfaces of the flexible membranes (which could be more crucial in systems where membranes are used as reflectors or lenses). That is, in implementations in which the deployable antenna is an LPDA, the flexible membranes may be deployed, unfurled, and/or tensioned to ensure that spacing between the antenna elements satisfies a predefined antenna element spacing condition.

The flexible membranes may include antenna elements composed of a conductive material. In implementations, the antenna elements may include one or more of integral or inlaid conductive elements embedded in etchings or otherwise embedded in the flexible membranes and/or rigid or semi-rigid elements coupled or integral thereto. In other implementations, the antenna elements may be conductive rods. In implementations with the conductive rods, if the rods are sufficiently resilient, flexible membranes may be omitted in favor of other structural support elements such as trusses, lanyard pulley systems, and telescoping antenna element rods that selectively deploy without external support.

In implementations in which the deployable antenna is an LPDA antenna, the distal-most conductive elements (e.g., distal-most in an axial or z-dimension) may be electrically coupled with EMR control circuitry via EMR circuitry couplers. The electrical connectivity between the distal-most antenna elements and more proximal antenna elements may alternate between sides of each flexible membrane in an alternating antenna element coupling configuration. For example, a single flexible membrane may include a first side and a second side divided by a central axis (e.g., along an axis parallel to the axial or z-axis and central within the radial or x-y plane projection of the flexible membrane). Each of the first side and the second side may include antenna elements, the first side antenna elements being substantially symmetrical to the second side antenna elements about the central axis. The deployable antenna system may include a first EMR circuitry coupler electrically coupled to a first distal-most antenna element on the first side and may include a second EMR circuitry coupler electrically coupled to a second distal-most antenna element on the second side. The first distal antenna element may be further electrically coupled with a second-most distal antenna element on the second side. The second distal antenna element may be further coupled with a second-most distal antenna element on the second side. The second-most distal element on the first side may be further electrically coupled with a third-most distal element on the second side. The second-most distal element on the second side may be further electrically coupled with a third-most distal element on the first side. The couplings may continue to alternate between sides (e.g., until there are no more proximal antenna elements to which to couple) in the alternating antenna element coupling configuration.

The flexible membranes may be composed of a flexible material and/or may comprise rigid or semi-rigid portions coupled to one another by flexible elements (e.g., flexures composed of flexible materials such as poly (4,4'-oxydiphenylene-pyromellitimide) or other polyimide films). Alternatively, the flexible elements may be elements of membrane surfaces to which the rigid or semi-rigid portions are coupled rather than separately coupled flexures. The flexibility may allow for furling of the flexible members to facilitate better packing for stowed configurations. In implementations with rigid or semi-rigid portions, the antenna elements may be coupled to or integrated into the rigid or semi-rigid portions. The integration may be by cutting or etching ridges into a surface of the rigid or semi-rigid portions and then introducing a conductive material to the ridges. The rigid or semi-rigid portions may include one or more of circuit boards and solar cells.

The flexible membranes may be furled in a predetermined manner such that furling discontinuities (e.g., creases, wrinkles, or folds) in the flexible membranes 117 may be located at predetermined positions based on a predefined furling procedure and/or configuration. Introducing furling discontinuities to antenna elements may stress the antenna elements, so minimizing the overlap and/or intersection of the furling discontinuities and the antenna elements may mitigate some of the effects of the stress the furling imposes on the antenna elements. Further, if the furling pattern is predefined and if the locations of the furling discontinuities relative to the antenna elements are known, the antenna elements can be reinforced at intersections or overlaps between the furling discontinuities and the antenna elements prior to furling that places the deployable antenna into a stowed or undeployed configuration.

Furls can cause stress to antenna elements, and furl resilience elements can be introduced to portions of a flexible membrane where furling discontinuities intersect or otherwise overlap with antenna elements. In implementations in which the antenna elements include conductors that are inlaid, embedded, or otherwise integrated into the flexible membranes, the antenna elements may be reinforced by introducing more conductive material to make the antenna elements more resilient to stress while maintaining the conductive and/or electromagnetic emission properties of the antenna elements. In implementations in which the antenna elements include rods, the rods may have preconfigured flexures or junctions at the intersections or overlapping portions between the furling discontinuities and the antenna elements that provide local flexibility while maintaining the conductive and/or electromagnetic emission properties of the antenna elements. In implementations in which a flexible membrane includes rigid or semirigid portions with flexible portions between the rigid or semi-rigid portions, antenna element portions that reside on or cross the flexible portions may be reinforced. The rigid or semi-rigid portions may include (e.g., exclusively or predominantly) electromagnetically insulating material in order to avoid or mitigate interference with the deployable antenna's 116 performance. In implementations, the rigid portions may be integral to the deployable antenna 116 at positions used for higher frequencies (e.g., positions that generate at least a predefined frequency) that benefit from deploying to a flatter surface (e.g., ones with lower fault tolerances that are less practically effectuated by tensioning the flexible membrane materials).

Some of the furling discontinuities may be arranged horizontally or radially (e.g., substantially within the x-y reference plane) to allow for folding the flexible membranes (e.g., when the folding membranes are fully radially extended) to reduce the footprint of the deployable satellite in the z-dimension. The horizontal furling discontinuities may be longer than other furling discontinuities, so it may be advantageous to stagger the horizontal discontinuities relative to antenna elements (e.g., especially, horizontally arranged antenna elements that may have large overlaps or intersections). In some implementations, the furling discontinuities may be at least partially vertical (e.g., extend at least partially in the z-dimension), such as diagonal (relative to the z-dimension and one or more of the x and y dimensions) furling discontinuities (e.g., ones in a staggered furl configuration) resulting from diagonal furls. It may not be feasible to stagger the antenna elements between the diagonal furling discontinuities, so the design of the deployable antenna 116 may reduce any overlap or intersection between the diagonal furling discontinuities and the antenna elements and/or may mitigate the furling effects by reinforcing the antenna elements are the overlapping or intersecting portion(s) with furl resilience elements. In implementations in which the deployable antenna is furled to reduce the radial or x-y plane footprint, the flexible membranes may further include substantially vertical furling discontinuities that are substantially parallel with the z-axis.

A number of configurations of the deployable antenna are contemplated. The deployable antenna may include any number of flexible membranes. Further, each of the flexible membranes can be formed in any number of shapes when unfurled including a circle, an ellipse, a triangle, a square, a rectangle, a trapezoid, a rhombus, a pentagon, a hexagon, a heptagon, an octagon, a nonagon, a decagon, an undecagon, a dodecagon, another polygon (e.g., having any number of sides with the same size and any angles therebetween of different or same magnitudes), a curvilinear shape, or substantial variants thereof (e.g., substantially polygonal but with sides that have curvilinear or catenary edges). In implementations, the deployable antenna may be axisymmetric about a central axis. In implementations, a width of a flexible membrane in the radial or x-y dimension plane reduces as the distance in the axial or z-dimension from the deployment base increases.

In implementations, two intersecting flexible membranes may be interleaved at an intersection. The two flexible membranes may define four corners at the intersection. The two flexible membranes may have a cruciform-shaped cross-section in the x-y reference plane when unfurled. Similarly, the radial support structures may have a substantially cruciform shape in the x-y reference plane and may extend symmetrically radially during deployment such that the radial support structures extend to a larger substantially cruciform shape in the x-y reference plane.

In implementations, each of the flexible membranes may be a membrane assembly including two or more sub-membranes separated by a predefined distance when unfurled. In these implementations, the intersection between the two flexible membranes may have a greater volume than if the flexible membranes were single membrane assemblies. In these implementations, the sub-membranes may be of the same or different shapes, of the same or different sizes, and/or coincident or staggered from a perspective orthogonal to planar surfaces of the sub-membranes when unfurled or deployed. The membrane assemblies may also form a deployable antenna with substantial axisymmetry. In implementations in which each of the flexible membranes has a membrane subassembly of two membranes with a predefined distance therebetween, the individual membranes of the membrane subassemblies may appear to have a cross-section in the x-y reference plane that substantially resembles a pound sign or hashtag. The predefined distances between the sub-membranes may be the substantially same for both of the subassemblies to establish axisymmetry. In implementations, the sub-membranes are coupled to opposite sides of rigid or semi-rigid elements. In implementations, the thickness of the rigid or semi-rigid elements represents the distance between the sub-membranes.

An implementation of the deployable antenna system includes two orthogonal log-periodic dipole arrays (e.g., full-panels) that are interleaved together (e.g., at central positions to form an axisymmetric deployable antenna) to form a single-phase center aperture, which will help to enable circularly polarized radiation patterns with a low axial ratio. The antenna elements (e.g., including C-band copper array elements) are etched on flexible membranes comprising thin polyimide membranes. The two individual linear log-periodic radiating structures may be fed with individual 500 feeder lines. This independent dual, orthogonal linear-polarized configuration can form any desired polarization. The design may be configured to provide a performance as shown in Table 1.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example deployable antenna system for deployment in an extraterrestrial environment is provided. The deployable antenna system comprising includes a deployment mechanism including one or more extendable support structures comprising at least one axial support structure adapted to extend in a z-direction parallel to a z-axis in the deployable antenna system and a deployable antenna attached to the one or more extendable support structures and adapted to be stowed in an undeployed state and to be unfurled into a deployed state by the deployment mechanism, the deployable antenna being further adapted to extend and unfurl during deployment from the deployment mechanism in the z-direction responsive to extension of the at least one axial support structure, the deployable antenna including one or more flexible membranes coupled to the at least one axial support structure and extending from the z-axis in the deployed state.

Another example deployable antenna system of any preceding system is provided, wherein the one or more flexible membranes extend radially from the z-axis orthogonally to each other.

Another example deployable antenna system of any preceding system is provided, wherein the one or more flexible membranes are tensioned panels in the deployed state.

Another example deployable antenna system of any preceding system is provided, wherein the one or more flexible membranes include a first flexible membrane and a second flexible membrane extending orthogonally to each other from the z-axis and interleaved with each other.

Another example deployable antenna system of any preceding system is provided, wherein the first flexible membrane is a dominant flexible membrane and the second flexible membrane is a subordinate flexible membrane, the interleaving including more material from the subordinate flexible membrane than from the dominant flexible membrane.

Another example deployable antenna system of any preceding system is provided, wherein the interleaving is at an intersection between the first flexible membrane and the second flexible membrane, and wherein, in the undeployed state, a first side of the second flexible membrane is at least partially staggered relative to a second side of the second flexible membrane about the intersection, and wherein a first side of the first flexible membrane is substantially aligned with a second side of the first flexible membrane about the intersection.

Another example deployable antenna system of any preceding system is provided, wherein, in the deployed state, a radial cross-section formed from an intersection of the first flexible membrane with the second flexible membrane is cruciform.

Another example deployable antenna system of any preceding system is provided, wherein the deployment mechanism includes at least one motorized strut assembly adapted to extend the at least one axial support structure parallel to the z-axis.

Another example deployable antenna system of any preceding system is provided, wherein the one or more flexible membranes include rigid elements coupled by flexible elements.

Another example deployable antenna system of any preceding system is provided, wherein at least two of the one or more flexible membranes includes two or more parallel sub-membranes, the two or more parallel sub-membranes coupled to one another to maintain a space between the two or more parallel sub-membranes of a predefined width.

Another example deployable antenna system of any preceding system is provided, wherein at least two of the one or more flexible membranes include two or more parallel sub-membranes, the at least two of the one or more flexible membranes being substantially perpendicular to one another.

Another example deployable antenna system of any preceding system is provided, wherein the one or more flexible membranes include a plurality of antenna elements.

Another example deployable antenna system of any preceding system is provided, wherein a spacing between the plurality of antenna elements along the z-direction on at least one of the one or more flexible membranes is non-uniform.

Another example deployable antenna system of any preceding system is provided, wherein at least one of the plurality of antenna elements includes a conductive trace inlaid in the one or more flexible membranes.

Another example deployable antenna system of any preceding system is provided, wherein the one or more flexible membranes further include one or more furling discontinuities in the one or more flexible membranes resulting from a furling of the one or more flexible membranes in the undeployed state, wherein at least one of the plurality of the antenna elements intersects at least one of the one or more furling discontinuities and one or more flexible membranes include at least one furl resilience element at the intersection.

Another example deployable antenna system of any preceding system is provided, wherein the one or more flexible membranes further include horizontal furling discontinuities in a direction substantially orthogonal to the z-axis, the horizontal furling discontinuities staggered in the z-direction relative to the plurality of antenna elements, wherein the horizontal furling discontinuities are from a furling of the one or more flexible membranes in the undeployed state.

Another example deployable antenna system of any preceding system is provided, wherein the plurality of antenna elements include elongate conductive members.

Another example deployable antenna system of any preceding system is provided, further including electromagnetic radiation (EMR) control circuitry and an EMR circuitry coupler, wherein a flexible membrane of the one or more flexible membranes includes a plurality of antenna elements, a first sub-membrane, and a second sub-membrane, and wherein a first conductive element of the EMR circuitry coupler is coupled at a distal portion to a distal-most antenna element of the first sub-membrane and a second conductive element of the EMR circuitry coupler is coupled to a distal-most antenna element of the second sub-membrane.

Another example deployable antenna system of any preceding system is provided, further including electromagnetic radiation (EMR) control circuitry and at least two EMR circuitry couplers, wherein a flexible membrane of the one or more flexible membranes includes antenna elements and wherein the EMR circuitry coupler is electrically coupled to the antenna elements on a flexible membrane of the one or more flexible membranes, the antenna elements positioned alternatively on a first side and a second side of a central antenna axis in the flexible membrane at positions along a z-direction.

Another example deployable antenna system of any preceding system is provided, further including electromagnetic radiation (EMR) control circuitry and an EMR circuitry coupler, wherein a flexible membrane of the one or more flexible membranes includes a plurality of antenna elements, a first sub-membrane, and a second sub-membrane, and wherein a flexible membrane of the one or more flexible membranes includes a first sub-membrane coupled to a second sub-membrane and antenna elements of the first sub-membrane are arranged with mirror symmetry about a central membrane axis relative to antenna elements of the second sub-membrane. The deployable antenna system of claim 1, wherein the one or more extendable support structures includes at least one radial support structure that is substantially orthogonal to the at least one axial support structure and extendable in a radial direction orthogonal to the at least one axial support structure, the at least one radial support structure coupled to the one or more flexible membranes and adapted to extend the one or more flexible membranes radially from the z-axis.

Another example deployable antenna system of any preceding system is provided, wherein the one or more extendable support structures includes at least one radial support structure that is substantially orthogonal to the at least one axial support structure and extendable in a radial direction orthogonal to the at least one axial support structure, the at least one radial support structure coupled to the one or more flexible membranes and adapted to extend the one or more flexible membranes radially from the z-axis.

Another example deployable antenna system of any preceding system is provided, wherein the at least one radial support structure are substantially coplanar.

Another example deployable antenna system of any preceding system is provided, wherein the at least one radial support structure form a cruciform shape in a radial plane.

Another example deployable antenna system of any preceding system is provided, wherein the at least one axial support structure is configured to extend along the z-axis responsively to the at least one radial support structure extending radially from the z-axis.

An example method for deploying a deployable antenna in an extraterrestrial environment from an undeployed state to a deployed state is provided. The method includes extending one or more axial support structures axially in a z-direction parallel to a z-axis, the one or more axial support structures coupled at a first end to the deployable antenna and at a second end to a deployment base from which the deployable antenna deploys and unfurling one or more flexible membranes of the deployable antenna by the extension, wherein the unfurling extends the one or more flexible membranes axially, wherein the one or more flexible membranes extend from the z-axis.

Another example method of any preceding method is provided, further including extending one or more radial support structures in a radial direction substantially orthogonal to the z-axis, each of the one or more radial support structures coupled on a first end to the deployable antenna and on a second end to the deployment base from which the deployable antenna deploys, wherein the extending causes the one or more flexible membranes to unfurl and extend in the radial direction.

Another example method of any preceding method is provided, the method further including tensioning rigid panels of the one or more flexible membranes.

Another example method of any preceding method is provided, wherein the operation of extending the one or more radial support structures includes extending the one or more radial support structures substantially within a radial plane.

Another example method of any preceding method is provided, wherein the one or more radial support structures form a cruciform shape in a radial plane.

Another example method of any preceding method is provided, wherein the operation of extending the one or more axial support structures is conducted responsively to the operation of extending the one or more radial support structures.

Another example method of any preceding method is provided, further including unfurling the one or more flexible membranes to extend radially from the z-axis orthogonally to each other.

Another example method of any preceding method is provided, wherein the operation of unfurling includes unfurling the one or more flexible membranes including a first flexible membrane and a second flexible membrane to extend orthogonally to each other from the z-axis from a furled configuration in the undeployed state in which the first flexible membrane and the second flexible membrane are interleaved with each other.

Another example method of any preceding method is provided, wherein the first flexible membrane is a dominant flexible membrane and the second flexible membrane is a subordinate flexible membrane, the interleaving including more material from the subordinate flexible membrane than from the dominant flexible membrane.

Another example method of any preceding method is provided, wherein the interleaving is at an intersection between the first flexible membrane and the second flexible membrane, and wherein, in the undeployed state, a first side of the second flexible membrane is at least partially staggered relative to a second side of the second flexible membrane about the intersection, and wherein a first side of the first flexible membrane is substantially aligned with a second side of the first flexible membrane about the intersection.

Another example method of any preceding method is provided, wherein the operation of unfurling includes unfurling the one or more flexible membranes to form a cruciform-shaped radial cross-section.

Another example method of any preceding method is provided, wherein the operation of extending the one or more axial support structures includes extending, by at least one motorized strut assembly, the one or more axial support structures to a predefined length.

Another example method of any preceding method is provided, wherein the operation of unfurling includes unfurling rigid elements coupled by flexible elements of the one or more flexible membranes.

Another example method of any preceding method is provided, wherein at least two of the one or more flexible membranes includes two or more parallel sub-membranes, the two or more parallel sub-membranes coupled to one another to maintain a space between the two or more parallel sub-membranes of a predefined width.

Another example method of any preceding method is provided, wherein at least two of the one or more flexible membranes include two or more parallel sub-membranes, the at least two of the one or more flexible membranes arranged perpendicularly to one another.

Another example method of any preceding method is provided, wherein the one or more flexible membranes include a plurality of antenna elements.

Another example method of any preceding method is provided, wherein a spacing between the plurality of antenna elements along the z-direction on at least one of the one or more flexible membranes is non-uniform.

Another example method of any preceding method is provided, wherein at least one of the plurality of antenna elements include a conductive trace inlaid in the one or more flexible membranes.

Another example method of any preceding method is provided, wherein the one or more flexible membranes further include one or more furling discontinuities in the one or more flexible membranes resulting from a furling of the one or more flexible membranes in the undeployed state, wherein at least one of the plurality of antenna elements intersects at least one of the one or more furling discontinuities and the one or more flexible membranes include at least one furl resilience element at the intersection.

Another example method of any preceding method is provided, wherein the one or more flexible membranes further include horizontal furling discontinuities in a direction substantially orthogonal to the z-axis, the horizontal furling discontinuities staggered in the z-direction relative to the plurality of antenna elements, wherein the horizontal furling discontinuities are from a furling of the one or more flexible membranes in the undeployed state.

Another example method of any preceding method is provided, wherein the plurality of antenna elements includes rigid, elongate conductive members.

Another example method of any preceding method is provided, extending an EMR circuitry coupler electrically coupled at a proximal portion to electromagnetic radiation (EMR) control circuitry, wherein a first conductive element of the EMR circuitry coupler is coupled at a distal portion to a distal-most antenna element of a first sub-membrane of a flexible membrane of the one or more flexible membranes and a second conductive element of the EMR circuitry coupler is coupled to a distal-most antenna element of a second sub-membrane of the flexible membrane.

Another example method of any preceding method is provided, further including extending an EMR circuitry coupler electrically coupled at a proximal portion to electromagnetic radiation (EMR) control circuitry, wherein the EMR circuitry coupler is electrically coupled to antenna elements on a flexible membrane of the one or more flexible membranes, the antenna elements positioned alternatively on a first side and a second side of a central antenna axis in the flexible membrane at positions along the z-direction.

Another example method of any preceding method is provided, further including extending an EMR circuitry coupler electrically coupled at a proximal portion to electromagnetic radiation (EMR) control circuitry, wherein a flexible membrane of the one or more flexible membranes includes a first sub-membrane coupled to a second sub-membrane and antenna elements of the first sub-membrane are arranged with mirror symmetry about a central membrane axis relative to antenna elements of the second sub-membrane.

An example system for deploying a deployable antenna in an extraterrestrial environment from an undeployed state to a deployed state is provided. The system includes means for extending one or more axial support structures axially in a z-direction parallel to a z-axis, the one or more axial support structures coupled at a first end to the deployable antenna and at a second end to a deployment base from which the deployable antenna deploys and means for unfurling one or more flexible membranes of the deployable antenna by the extension, wherein the unfurling extends the one or more flexible membranes axially, wherein the one or more flexible membranes extend from the z-axis.

Another example system of any preceding system is provided, further including means for extending one or more radial support structures in a radial direction substantially orthogonal to the z-axis, each of the one or more radial support structures coupled on a first end to the deployable antenna and on a second end to the deployment base from which the deployable antenna deploys, wherein the extension causes the one or more flexible membranes to unfurl and extend in the radial direction.

Another example system of any preceding system is provided, the system further including means for tensioning rigid panels of the one or more flexible membranes.

Another example system of any preceding system is provided, wherein the means for extending the one or more radial support structures includes means for extending the one or more radial support structures substantially within a radial plane.

Another example system of any preceding system is provided, wherein the one or more radial support structures form a cruciform shape in a radial plane.

Another example system of any preceding system is provided, wherein the extension of the one or more axial support structures is conducted responsively to the extension of the one or more radial support structures.

Another example system of any preceding system is provided, further including means for unfurling the one or more flexible membranes to extend radially from the z-axis orthogonally to each other.

Another example system of any preceding system is provided, wherein the means for unfurling includes means for unfurling the one or more flexible membranes including a first flexible membrane and a second flexible membrane to extend orthogonally to each other from the z-axis from a furled configuration in the undeployed state in which the first flexible membrane and the second flexible membrane are interleaved with each other.

Another example system of any preceding system is provided, wherein the first flexible membrane is a dominant flexible membrane and the second flexible membrane is a subordinate flexible membrane, the interleaving including more material from the subordinate flexible membrane than from the dominant flexible membrane.

Another example system of any preceding system is provided, wherein the interleaving is at an intersection between the first flexible membrane and the second flexible membrane, and wherein, in the undeployed state, a first side of the second flexible membrane is at least partially staggered relative to a second side of the second flexible membrane about the intersection, and wherein a first side of the first flexible membrane is substantially aligned with a second side of the first flexible membrane about the intersection.

Another example system of any preceding system is provided, wherein the means for unfurling includes means for unfurling the one or more flexible membranes to form a cruciform-shaped radial cross-section.

Another example system of any preceding system is provided, wherein the means for extending the one or more axial support structures include means for extending, by at least one motorized strut assembly, the one or more axial support structures to a predefined length.

Another example system of any preceding system is provided, wherein the means for unfurling include means for unfurling rigid elements coupled by flexible elements of the one or more flexible membranes.

Another example system of any preceding system is provided, wherein at least two of the one or more flexible membranes include two or more parallel sub-membranes, the two or more parallel sub-membranes coupled to one another to maintain a space between the two or more parallel sub-membranes of a predefined width.

Another example system of any preceding system is provided, wherein at least two of the one or more flexible membranes include two or more parallel sub-membranes, the at least two of the one or more flexible membranes arranged perpendicularly to one another.

Another example system of any preceding system is provided, wherein the one or more flexible membranes include a plurality of antenna elements.

Another example system of any preceding system is provided, wherein a spacing between the plurality of antenna elements along the z-direction on at least one of the one or more flexible membranes is non-uniform.

Another example system of any preceding system is provided, wherein at least one of the plurality of antenna elements includes a conductive trace inlaid in the one or more flexible membranes.

Another example system of any preceding system is provided, wherein the one or more flexible membranes further include one or more furling discontinuities in the one or more flexible membranes resulting from a furling of the one or more flexible membranes in the undeployed state, wherein at least one of the plurality of antenna elements intersects at least one of the one or more furling discontinuities and the one or more flexible membranes include at least one furl resilience element at the intersection.

Another example system of any preceding system is provided, wherein the one or more flexible membranes further include horizontal furling discontinuities in a direction substantially orthogonal to the z-axis, the horizontal furling discontinuities staggered in the z-direction relative to the plurality of antenna elements, wherein the horizontal furling discontinuities are from a furling of the one or more flexible membranes in the undeployed state.

Another example system of any preceding system is provided, wherein the plurality of antenna elements includes rigid, elongate conductive members.

Another example system of any preceding system is provided, further including means for extending an EMR circuitry coupler electrically coupled at a proximal portion to electromagnetic radiation (EMR) control circuitry, wherein a first conductive element of the EMR circuitry coupler is coupled at a distal portion to a distal-most antenna element of a first sub-membrane of a flexible membrane of the one or more flexible membranes and a second conductive element of the EMR circuitry coupler is coupled to a distal-most antenna element of a second sub-membrane of the flexible membrane.

Another example system of any preceding system is provided, further including means for extending an EMR circuitry coupler electrically coupled at a proximal portion to electromagnetic radiation (EMR) control circuitry, wherein the EMR circuitry coupler is electrically coupled to antenna elements on a flexible membrane of the one or more flexible membranes, the antenna elements positioned alternatively on a first side and a second side of a central antenna axis in the flexible membrane at positions along the z-direction.

Another example system of any preceding system is provided, further including means for extending an EMR circuitry coupler electrically coupled at a proximal portion to electromagnetic radiation (EMR) control circuitry, wherein a flexible membrane of the one or more flexible membranes includes a first sub-membrane coupled to a second sub-membrane and antenna elements of the first sub-membrane are arranged with mirror symmetry about a central membrane axis relative to antenna elements of the second sub-membrane.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

As used herein, terms such as "substantially," "about," "approximately," or other terms of relative degree are interpreted as a person skilled in the art would interpret the terms and/or amount to a magnitude of variability of one or more of 1%, 2%, 3%, 4%, 5%, 6%, 7%, 8%, 9%, 10%, 11%, 12%, 13%, 14%, or 15% of a metric relevant to the quantitative or qualitative feature described. For example, a term of relative degree applied to orthogonality suggests an angle may have a magnitude of variability relative to a right angle. When values are presented herein for particular features, parameters, and/or a magnitude of variability, ranges above, ranges below, and ranges between the values are contemplated.

What is claimed is:

1. A deployable antenna system for deployment in an extraterrestrial environment, the deployable antenna system comprising:

a deployment mechanism including an extendable support structure and adapted to transition the deployable antenna system from an undeployed state to a deployed state; and a deployable antenna including antenna elements adapted to be collapsed substantially along a z-axis in the undeployed state and to be expanded substantially along the z-axis into the deployed state by increasing the extendable support structure in length substantially along the z-axis from a deployment base and distancing each of the antenna elements a different distance along the z-axis from the deployment base.

2. The deployable antenna system of claim 1, wherein spacings between adjacent antenna elements of the antenna elements substantially along the z-axis are non-uniform in the deployed state.

3. The deployable antenna system of claim 1, wherein spacings between adjacent antenna elements of the antenna elements substantially along the z-axis are uniform in the deployed state.

4. The deployable antenna system of claim 1, wherein distances between adjacent antenna elements of the antenna elements along the z-axis decrease with increased distance in the z-axis from the deployment base in the deployed state.

5. The deployable antenna system of claim 1, wherein distances between adjacent antenna elements of the antenna elements along the z-axis increase with increased distance in the z-axis from the deployment base in the deployed state.

6. The deployable antenna system of claim 1, wherein each of the antenna elements extends statically a same radial distance relative to the z-axis in the undeployed state as in the deployed state.

7. The deployable antenna system of claim 1, wherein one or more of the antenna elements increase in radial distance relative to the z-axis during the transition from the undeployed state to the deployed state.

8. The deployable antenna system of claim 1, further comprising:

electromagnetic radiation (EMR) control circuitry; and an EMR circuitry coupler that electrically couples at least one of the antenna elements with the EMR control circuitry.

9. The deployable antenna system of claim 1, further comprising:

a first flexible membrane coupled to move with a distal end of the extendable support structure and configured to be unfurled substantially along the z-axis by the extendable support structure increasing in length substantially along the z-axis.

10. The deployable antenna system of claim 9, wherein at least a portion of the antenna elements are more rigid than the first flexible membrane.

11. The deployable antenna system of claim 9, further comprising:

a distal plate positioned at the distal end of the extendable support structure, wherein the first flexible membrane is coupled to the distal end of the extendable support structure by the distal plate.

12. The deployable antenna system of claim 9, wherein one or more of the antenna elements are coupled to the first flexible membrane.

13. The deployable antenna system of claim 12, wherein the unfurling of the first flexible membrane distances each of the one or more of the antenna elements the corresponding different distance from the deployment base.

14. The deployable antenna system of claim 9, further comprising:

a second flexible membrane coupled to move with a distal end of the extendable support structure and configured to be unfurled substantially along the z-axis by the increasing the extendable support structure in length substantially along the z-axis.

15. The deployable antenna system of claim 14, wherein the unfurling of the first flexible membrane distances a first of the antenna elements a first distance from the deployment base and wherein the unfurling of the second flexible membrane distances a second of the antenna elements a second distance from the deployment base different from the first distance.

16. The deployable antenna system of claim 9, further comprising:

a second flexible membrane coupled to move with a distal end of the extendable support structure and configured to be unfurled substantially along the z-axis by the increasing the extendable support structure in length substantially along the z-axis, wherein a planar surface of the first flexible membrane is substantially perpendicular to a planar surface of the second flexible membrane.

17. The deployable antenna system of claim 14, further comprising:

a distal plate positioned at the distal end of the extendable support structure, wherein the first flexible membrane and the second flexible membrane are coupled to the distal end of the extendable support structure by the distal plate.

18. The deployable antenna system of claim 1, wherein the antenna elements are stacked in the undeployed state.

19. The deployable antenna system of claim 1, further comprising:

a canister including a moveable lid, wherein the deployable antenna is stowed within the canister in the undeployed state, and the moveable lid is moveable during the transition from the undeployed state to the deployed state to provide the deployable antenna a space into which the deployable antenna is configured to deploy along the z-axis.

20. The deployable antenna system of claim 1, further comprising:

a moveable lid configured to move during the transition from the undeployed state to the deployed state to allow the deployable antenna to increase in length along the z-axis.

21. The deployable antenna system of claim 19, wherein movement of the moveable lid provides the deployable antenna access to a space into which the deployable antenna is configured to deploy along the z-axis.

22. The deployable antenna system of claim 1, further comprising:

rigid portions, wherein each of the antenna elements is integrated into a corresponding one of the rigid portions, and the increasing the extendable support structure in length substantially along the z-axis distances each of the antenna elements with the corresponding one of the rigid portions from the deployment base.

23. The deployable antenna system of claim 22, further comprising:

a flexible membrane configured to be unfurled substantially along the z-axis by the extendable support structure increasing in length substantially along the z-axis, the rigid portions coupled to the flexible membrane such that each of the antenna elements is positioned at the corresponding different distance from the deployment base when the flexible membrane is unfurled.

24. A deployable antenna system for deployment in an extraterrestrial environment, the deployable antenna system comprising:

a deployment mechanism including an extendable support structure adapted to increase in length substantially along a z-direction parallel to a z-axis in the deployable antenna system; and a deployable antenna including antenna elements, the deployable antenna attached to the extendable support structure and adapted to be collapsed in an undeployed state and to expand into a deployed state by the deployment mechanism, the deployable antenna being further adapted to expand during deployment from the deployment mechanism in the z-direction responsive to the increase in length substantially along the z-direction of the extendable support structure.

25. The deployable antenna system of claim 24, wherein spacings between adjacent antenna elements of the antenna elements substantially along the z-axis are non-uniform in the deployed state.

26. The deployable antenna system of claim 24, wherein spacings between adjacent antenna elements of the antenna elements substantially along the z-axis are uniform in the deployed state.

27. The deployable antenna system of claim 24, wherein each of the antenna elements extends statically a same radial distance relative to the z-axis in the undeployed state as in the deployed state.

28. The deployable antenna system of claim 24, wherein one or more of the antenna elements increase in radial distance from the z-axis during a transition from the undeployed state to the deployed state.

29. The deployable antenna system of claim 24, further comprising:

electromagnetic radiation (EMR) control circuitry; and an EMR circuitry coupler that electrically couples at least one of the antenna elements with the EMR control circuitry.

30. The deployable antenna system of claim 24, further comprising:

a first flexible membrane coupled to a distal end of the extendable support structure and configured to be unfurled substantially along the z-axis by the extendable support structure increasing in length substantially along the z-axis.

31. The deployable antenna system of claim 30, wherein at least a portion of the antenna elements are more rigid than the first flexible membrane.

32. The deployable antenna system of claim 30, further comprising:

a distal plate positioned at the distal end of the extendable support structure, wherein the first flexible membrane is coupled to the distal end of the extendable support structure by the distal plate.

33. The deployable antenna system of claim 30, wherein one or more of the antenna elements are coupled to the first flexible membrane.

34. The deployable antenna system of claim 33, further comprising:

a second flexible membrane coupled to move with a distal end of the extendable support structure and configured to be unfurled substantially along the z-axis by the increase of the extendable support structure in length substantially along the z-axis.

35. The deployable antenna system of claim 30, further comprising:

a second flexible membrane coupled to move with a distal end of the extendable support structure and configured to be unfurled substantially along the z-axis by the increase of the extendable support structure in length substantially along the z-axis, wherein a planar surface of the first flexible membrane is substantially perpendicular to a planar surface of the second flexible membrane.

36. The deployable antenna system of claim 35, further comprising:

a distal plate positioned at the distal end of the extendable support structure, wherein the first flexible membrane and the second flexible membrane are coupled to the distal end of the extendable support structure by the distal plate.

37. The deployable antenna system of claim 30, wherein the antenna elements are embedded in the first flexible membrane.

38. The deployable antenna system of claim 24, further comprising:

a moveable lid configured to move during a transition from the undeployed state to the deployed state to allow the deployable antenna to increase in length along the z-axis.

39. A method for deploying a deployable antenna system in an extraterrestrial environment, the method comprising:

increasing, by a deployment mechanism, an extendable support structure in length substantially along a z-axis from a deployment base;

expanding, by the operation of increasing, a deployable antenna including antenna elements to transition the deployable antenna system from an undeployed state in which the deployable antenna is collapsed substantially along the z-axis to a deployed state in which the deployable antenna is expanded substantially along the z-axis; and distancing, by the operation of expanding, each of the antenna elements a different distance from the deployment base.

40. The method of claim 39, wherein spacings between adjacent antenna elements of the antenna elements substantially along the z-axis are non-uniform in the deployed state.

41. The method of claim 39, wherein spacings between adjacent antenna elements of the antenna elements substantially along the z-axis are uniform in the deployed state.

42. The method of claim 39, wherein distances between adjacent antenna elements of the antenna elements along the z-axis decrease with increased distance in the z-axis from the deployment base in the deployed state.

43. The method of claim 39, wherein distances between adjacent antenna elements of the antenna elements along the z-axis increase with increased distance in the z-axis from the deployment base in the deployed state.

44. The method of claim 39, further comprising:

maintaining a static radial distance of the antenna elements from the z-axis in the deployed state and the undeployed state.

45. The method of claim 39, further comprising:

radially expanding the deployable antenna to increase one or more of the antenna elements in radial distance relative to the z-axis during a transition from the undeployed state to the deployed state.

46. The method of claim 39, further comprising:

unfurling, responsive to the operation of increasing, a first flexible membrane substantially along the z-axis, the first flexible membrane coupled to move with a distal end of the extendable support structure.

47. The method of claim 46, further comprising:

unfurling, responsive to the operation of increasing, a second flexible membrane substantially along the z-axis, the first flexible membrane coupled to move with a distal end of the extendable support structure, wherein the unfurling of the first flexible membrane distances a first of the antenna elements a first distance from the deployment base and the unfurling of the second flexible membrane distances a second of the antenna elements a second distance from the deployment base different from the first distance.

48. The method of claim 39, further comprising:

moving a moveable lid to provide access to space into which the deployable antenna is configured to deploy along the z-axis, wherein the operation of increasing is responsive to the operation of moving.

* * * * *